United States Patent [19]

Shaefer

[11] Patent Number: 5,222,192
[45] Date of Patent: Jun. 22, 1993

[54] OPTIMIZATION TECHNIQUES USING GENETIC ALGORITHMS

[75] Inventor: Craig G. Shaefer, Charlestown, Mass.

[73] Assignee: The Rowland Institute for Science, Inc., Cambridge, Mass.

[21] Appl. No.: 939,420

[22] Filed: Sep. 3, 1992

Related U.S. Application Data

[63] Continuation of Ser. No. 865,783, Apr. 7, 1992, abandoned, which is a continuation of Ser. No. 760,818, Sep. 17, 1991, abandoned, which is a continuation of Ser. No. 479,184, Feb. 12, 1990, abandoned, which is a continuation of Ser. No. 157,278, Feb. 17, 1988, abandoned.

[51] Int. Cl.$^5$ .................................... G06F 15/18
[52] U.S. Cl. ................................................ 395/13
[58] Field of Search ...................................... 395/13

[56] References Cited

U.S. PATENT DOCUMENTS

| | | | |
|---|---|---|---|
| 4,570,227 | 2/1986 | Tachi et al. | 364/444 |
| 4,642,782 | 2/1987 | Kemper et al. | 364/554 |
| 4,697,242 | 9/1987 | Holland et al. | 364/513 |
| 4,881,178 | 11/1989 | Holland et al. | 364/513 |
| 4,935,877 | 6/1990 | Koza | 364/513 |

OTHER PUBLICATIONS

Ackley, David H, "A Connectionist Machine for Genetic Hillclimbing", 1987, pp. 1–102.
Ackley, David H., "A Connectionist Algorithm for Genetic Search", Jul. 24–26, 1985, pp. 121–135.
Holland, John H., "Adaption in Natural and Artificial Systems", 1975, pp, 1–120.
Keller, Harbert B., "Global Homotopies and Newton Methods", Symposium in Recent Advances in Numerical Analysis, 1978, pp. 73–94.
De Jong, Kenneth Alan, "An Analysis of the Behavior of a Class of Genetic Adaptive Systems", 1975, pp. 1–196.

Primary Examiner—Allen R. MacDonald
Attorney, Agent, or Firm—Fish & Richardson

[57] ABSTRACT

In one aspect, an optimization method finds the best solution to a problem of the kind for which there is a space of possible solutions; in the method, tokens (e.g., chromosomes) take on values that represent trial solutions in accordance with a representational scheme that defines the relationships between given token values and corresponding trial solutions; by an iterative process, the values of the tokens are changed to explore the solution space and to converge on the best solution; and for at least some iterations, characteristics of the tokens and/or the trial solutions are analyzed and the representational scheme for later iterations is modified based on the analysis for earlier iterations without interrrupting the succession of iterations. In another aspect, a set of operators is made available to enable a user to implement any one of at least two different algorithms.

38 Claims, 27 Drawing Sheets

Extended SGAO Operators and their Variables within the ARGOT Framework

| Symbol | Name | {Trigger condition} or Domain |
|---|---|---|
| $C(C_t, C_\theta)$ | Crossover Operator ,260 | $\{\text{mod}(t, C_t) = 0, r \leq C_\theta\}$ |
| $C_t; C_\theta$ | Crossover Generation; Rate | $0 \leq C_t; 0 \leq C_\theta \leq 1$ |
| $L(m)$ | Selection Operator (of Chromosome m) ,262 | $\{\sum_{k=1}^{m} \bar{P} < rn \langle \bar{P}_k \rangle \leq \sum_{k=1}^{m+1} \bar{P}_k\}$ |
| $M(M_t, M_\theta)$ | Mutation Operator ,323 | $\{\text{mod}(t, M_t) = 0, r \leq M_\theta\}$ |
| $M_t; M_\theta$ | Mutation Generation; Rate | $0 \leq M_t; 0 \leq M_\theta \leq 1$ |
| $E_S; E_{St}$ | Standard Elitism and Generation ,301 | $\{\text{mod}(t, E_{St}) = 0\}; E_{St} = 1$ |

FIG. 9

| ARGOT Operators and their Variables | | |
|---|---|---|
| Symbol | Name | {Trigger condition} or Domain |
| $R_I(R_t, R_{I\phi}, R_{I\lambda})$ | Increase Resolution Operator ,270 | $\{mod(t,R_t)=0, [M_C]>R_{I\phi}\}$ |
| $R_D(R_t, R_{D\phi}, R_{D\lambda})$ | Decrease Resolution Operator ,272 | $\{mod(t,R_t)=0, [M_C]<R_{D\phi}\}$ |
| $R_t$ | Resolution Generation | $0 \leq R_t$ |
| $R_{I\phi}/R_{D\phi}$ | Increase/Decrease Thresholds ,280 | $0 \leq R_{D\phi} \leq R_{I\phi}$ |
| $R_{I\lambda}/R_{D\lambda}$ | Increase/Decrease Factors | $0 \leq R_{I\lambda}, 0 \leq R_{D\lambda}$ |
| $D(R_t, D_\lambda)$ | Dither Operator ,274 | $\{mod(t,R_t)=0, R_{D\phi} \leq [M_C] \leq R_{I\phi}\}$ |
| $D_\lambda$ | Dither Factor | $0 \leq D_\lambda$ |
| $S_L(S_t, S_{L\phi}, S_\lambda)$ | Shift Left Operator ,308 | $\{mod(t,S_t)=0, [M_P] \leq S_{L\phi}\}$ |
| $S_R(S_t, S_{R\phi}, S_\lambda)$ | Shift Right Operator ,310 | $\{mod(t,S_t)=0, [M_P] \geq S_{R\phi}\}$ |
| $S_t, S_\lambda$ | Shift Generation; Factor ,290 | $0 \leq S_t; 0 \leq S_\lambda$ |
| $S_{L\phi}/S_{R\phi}$ | Left/Right Thresholds ,288 | $0 \leq S_{L\phi} < S_{R\phi} \leq 1$ |
| $V_E(V_t, V_{E\phi}, V_{E\lambda})$ | Expansion Operator ,314 | $\{mod(t,V_t)=0, [M_V] \geq V_{E\phi}\}$ |
| $V_C(V_t, V_{C\phi}, V_{C\lambda})$ | Contraction Operator ,318 | $\{mod(t,V_t)=0, [M_V] \leq V_{C\phi}\}$ |
| 316 $V_t$ 320 | Expansion/Contraction Generation | $0 \leq V_t$ |
| $V_{E\phi}/V_{C\phi}$ | Expansion/Contraction Thresholds,294 | $0 \leq V_{C\phi} < V_{E\phi} \leq 1$ |
| $V_{E\lambda}/V_{C\lambda}$ | Expansion/Contraction Factors ,292 | $0 \leq V_{E\lambda}, 0 \leq V_{C\lambda}$ |
| $Mod_S(Mod_t, Mod_{S\phi})$ | Splitting Operator ,352 | $\{mod(t,Mod_t)=0, [M_{Mod}] \geq Mod_{S\phi}\}$ |
| $Mod_J(Mod_t, Mod_{J\phi})$ | Joining Operator ,356 | $\{mod(t, Mod_t)=0, [M_{Mod}] \leq Mod_{J\phi}\}$ |
| $Mod_t$ | Speciation Generation | $0 \leq Mod_t$ |
| $Mod_{S\phi}/Mod_{J\phi}$ | Splitting/Joining Thresholds ,350 | $0 \leq Mod_{J\phi} < Mod_{S\phi}$ |

FIG. 10a

| | | |
|---|---|---|
| $E_V(E_t,E_\lambda)$ | Ultra Elitist Operator ,334 | $\{mod(t,E_t)=0, P_U < E_\lambda P_B\}$ |
| $E_t, E_\lambda$ | Elitist Generation: Factor | $0 \leq E_t; 0 < E_\lambda$ |
| $E_R$ | Roving Elitist Operator ,332 | {after other ARGOT operators} |
| $H(H_t,H_\phi)$ | Homotopy Optimizer Operator ,322 | $\{mod(t,H_t)=0, [M_C,M_V] \leq H_\phi\}$ |
| $H_t; H_\phi$ | Homotopy Generation; Threshold ,345 | $0 \leq H_t; 0 \leq H_\phi$ |
| $\hat{M}(\hat{M}_t, M_\theta, \hat{M}_\phi)$ | Metropolis Mutation Operator ,340 | $\{mod(t,\hat{M}_t)=0, r_1 \leq M_\theta$ and $\Delta P_k \leq 0$ or $r_2 \leq \exp(-\Delta P_k/\hat{M}_\phi \mathcal{T})\}$ |
| $\hat{M}_t; \hat{M}_\phi$ | Metropolis Generation; Factor ,341 | $0 \leq \hat{M}_t; 0 < \hat{M}_\phi$ |
| $T_L(T_t,T_{L\phi},\mathcal{T}_{L\phi}T_\lambda)$ | Annealing Schedule Operator(lower) 324 | $\{mod(t,T_t)=0, [M_C,M_V] < T_{L\phi}\}$ |
| $T_H(T_t,T_{H\phi},\mathcal{T}_{H\phi}T_\lambda)$ | Annealing Schedule Operator(higher) | $\{mod(t,T_t)=0, [M_C,M_V] > T_{H\phi}\}$ |
| $T_t; T_\lambda$ | Annealing Schedule Generation; Factor 343 | $0 \leq T_t; 0 \leq T_\lambda \leq 1$ |
| $T_{L\phi}/T_{H\phi}$ | Schedule Thresholds (lower/higher) | $0 \leq T_{L\phi} \leq T_{H\phi}$ |
| $\mathcal{T}_{L\phi}/\mathcal{T}_{H\phi}$ | Temperature Bounds (lower/higher) | $0 \leq \mathcal{T}_{L\phi} \leq \mathcal{T} \leq \mathcal{T}_{H\phi} \leq \infty$ |

FIG. 10b

MEASUREMENTS [M]

| Type | Symbol | Name | Domain |
|---|---|---|---|
| $[M_C]$ | $\epsilon$ | Chromosome 'Vertical' Convergence | $\epsilon \geq 0$ |
| | $\langle \epsilon \rangle$ | Normalized Convergence | $0 \leq \langle \epsilon \rangle \leq 1$ |
| | $\epsilon_i$ | Gene Convergence | $\epsilon_i \geq 0$ |
| 264 | $\langle \epsilon_i \rangle$ | Normalized Gene Convergence | $0 \leq \langle \epsilon_i \rangle \leq 1$ |
| $[M_p]$ | $\Pi$ | Chromosome Parameter Shift | $\Pi \geq 0$ |
| | $\langle \Pi \rangle$ | Normalized Shift | $0 \leq \langle \Pi \rangle \leq 1$ |
| | $\pi_i$ | Gene Parameter Shift | $\pi_i \geq 0$ |
| 302 | $\langle \pi_i \rangle$ | Normalized Gene Shift ,281 | $0 \leq \langle \pi_i \rangle \leq 1$ |
| $[M_V]$ | $\Xi$ | Chromosome Parameter Variance | $\Xi \geq 0$ |
| | $\langle \Xi \rangle$ | Normalized Variance | $0 \leq \langle \Xi \rangle \leq 1$ |
| | $\xi_i$ | Gene Parameter Variance | $\xi_i \geq 0$ |
| | $\langle \xi_i \rangle$ | Normalized Gene Variance | $0 \leq \langle \xi_i \rangle \leq 1$ |
| 304 | | | |
| $[M_{Mod}]$ | $\Delta$ | Chromosome Parameter Multimodality | $\Delta \geq 0$ |
| | $\langle \Delta \rangle$ | Normalized Multimodality | $0 \leq \langle \Delta \rangle \leq 1$ |
| | $\delta_i$ | Gene Parameter Multimodality | $\delta_i \geq 0$ |
| 306 | $\langle \delta_i \rangle$ | Normalized Gene Multimodality | $0 \leq \langle \delta_i \rangle \leq 1$ |

FIG. 11

ARGOT Variables

| Symbol | Name | {Trigger} or Domain |
| --- | --- | --- |
| $r$ | Pseudo-Random function (uniform) | $0 \leq r \leq 1$ |
| $t$ | Generation (time) | $0 \leq t$ |
| $j$ | Gene Index | $1 \leq j \leq$ (number of parameters) |
| $n$ | Population Size (number of Chromosomes) | $1 \leq n$ |
| $k$ | Chromosome Index | $1 \leq k \leq n$ |
| $P_k$ | Payoff to Chromosome $k$ | $0 \leq P_k$ |
| $P_U$ | Ultra Payoff ,336 | $0 \leq P_U = \min\{P_B\}, (\forall t)$ |
| $P_B$ | Best Payoff ,338 | $0 \leq P_U \leq P_B \leq P_k, (\forall k)$ |
| $\tau$ | Metropolis Temperature | $0 \leq \tau \leq \infty$ |

FIG. 12

ARGOT Operator Parameters

| Symbol | Name | [M] | Domain | Typical |
|---|---|---|---|---|
| $R_{I\phi}$ | Increase Resolution Threshold | $\langle \varepsilon_i \rangle$ | (.75, .95) | .85 |
| $R_{I\lambda}$ | Increase Resolution Factor | --- | {0, 1} | 1 |
| $R_{D\phi}$ | Decrease Resolution Threshold | $(\varepsilon_i)$ | (.55, .85) | .75 |
| $R_{D\lambda}$ | Decrease Resolution Factor | --- | {-1, 0} | -1 |
| $l_i$ | Gene Length | --- | $(l_{Li}, l_{Hi})$ | 4-5 (A) |
| $l_{Li}$ | Gene Length Minimum | --- | $(1, l_{Hi})$ | 3 |
| $l_{Hi}$ | Gene Length Maximum | --- | $(l_{Li}, 32)$ | {20, 10} |
| $D\lambda$ | Dither Factor | --- | (0, 2) | 1 |
| $R_t$ | Resolution Generation | --- | (5, 25) | {6, 5} |
| $S_{L\phi}$ | Shift Left Threshold | $\langle \pi_i \rangle$ | (.2, .4) | .3 |
| $S_{R\phi}$ | Shift Right Threshold | $\langle \pi_i \rangle$ | (.6, .8) | .7 |
| $S\lambda$ | Shift Factor | --- | (.1, .5) | .1 |
| $S_t$ | Shift Generation | --- | (5, 25) | {6, 5} |
| $E_{Ut}$ | Ultra Elitism Generation | --- | (5, 50) | {25, 5} |
| $E_R$ | Roving Elitism | --- | --- | *always* |
| $V_{E\phi}$ | Expansion Threshold | $(\xi_i)$ | (.15, .35) | .3 |
| $V_{E\lambda}$ | Expansion Factor | --- | (.1, 1) | .2 |
| $V_{C\lambda}$ | Contraction Threshold | $(\xi_i)$ | (.05, .25) | .2 |
| $V_{C\lambda}$ | Contraction Factor | --- | (.1, .5) | .1 |
| $V_t$ | Expansion/Contraction Generation | --- | (5, 25) | {6, 5} |

FIG. 17a

| | | | | |
|---|---|---|---|---|
| $Mod_{S\phi}$ Splitting Threshold | | $\langle \delta_i \rangle$ | (.1, 1) | .6 |
| $Mod_{J\phi}$ Joining Threshold | | $\langle \delta_i \rangle$ | (.01, .25) | .1 |
| $Mod_t$ Speciation Generation | | --- | (15, 50) | 0 |
| $H\phi$ | Homotopy Threshold | $\langle \epsilon_i \rangle$ | (.5, .98) | .95 |
| | | $\langle \xi_i \rangle$ | (.05, .4) | .08 |
| $H_t$ | Homotopy Generation | --- | (10, 50) | 0 |
| $T_{L\phi}$ | Annealing Schedule Threshold (lower) $\langle \epsilon \rangle$ | | (.25, .75) | .5 |
| | $\langle \Xi \rangle$ | | (.1, .25) | .15 |
| $T_{H\phi}$ | Annealing Schedule Threshold (higher) $\langle \epsilon \rangle$ | | (.5, .95) | .9 |
| | $\langle \Xi \rangle$ | | (.25, .45) | .35 |
| $T_\lambda$ | Annealing Temperature Factor | --- | (.8, 1) | .9 |
| $T_t$ | Annealing Generation | --- | (0 - 5) | 0 |
| $\hat{M}_\phi$ | Metropolis Temperature Threshold | --- | (1, 2) | 1 |
| $\tau_{L\phi}$ | Metropolis Temperature Bound (lower) | --- | (0, $10^3$) | 0 |
| $\tau_{H\phi}$ | Metropolis Temperature Bound (higher) | --- | ($10^2$, $10^9$) | $10^6$-$10^7$ |
| $\hat{M}_t$ | Metropolis Generation | --- | (0 - 5) | 0 |

FIG. 17b

| Symbol | Genetic Operator | | | |
|---|---|---|---|---|
| | Name | [M] | Domain | Typical |
| $t_{max}$ | Maximum Generation | — | 15-5000 | 250 |
| $n$ | Population Size | — | (1, 8192) | [100, 8192] |
| $C_\theta$ | Crossover Rate | — | [.5, .95] | [.8, .5] |
| $C_t$ | Crossover Generation | — | (0, 2) | 1 |
| $M_\theta$ | Mutation Rate | — | (.0001, .05) | (.01, .005) |
| $M_t$ | Mutation Generation | — | (0, 2) | 1 |
| $E_{S_t}$ | Standard Elitism Generation | — | (0, 2) | 1 |

FIG. 18

GENERATIONS

| Classification of Algorithms for Function Optimization | | | |
|---|---|---|---|
| Symbol | Name | Primary | Secondary |
| $\mathcal{G}$ | Genetic | C,M,L | E$_S$ |
| $\mathcal{M}$ | Mutation | M,$\hat{M}$,T$_L$, T$_H$, L | S$_L$, S$_R$, V$_E$, V$_C$ |
| $\mathcal{H}$ | Homotopy | H | C,M,$\hat{M}$,L |
| $\mathcal{A}$ | ARGOT | R$_I$, R$_D$, D, S$_L$, S$_R$, V$_E$, V$_C$, E$_U$, E$_R$ | C,M,$\hat{M}$,T$_L$, T$_H$, H,L |

FIG. 33

OPTIMIZATION TECHNIQUES USING GENETIC ALGORITHMS

This is a continuation of application Ser. No. 07/865,783 filed on Apr. 7, 1992 now abandoned; which is a continuation of Ser. No. 07/760,818, filed Sep. 17, 1991, now abandoned; which was a continuation of Ser. No. 07/479,184 filed Feb. 12, 1990, now abandoned; which was a continuation of Ser. No. 07/157,278 filed Feb. 17, 1988, now abandoned.

BACKGROUND OF THE INVENTION

This invention relates to optimization techniques for finding the best solution to a problem of the kind that has a number of possible solutions.

In one classic problem of this kind (see FIG. 1), called the traveling salesman problem (TSP), the goal is to find the shortest route or tour (based on some criterion such as total distance traveled or time spent) that passes once through every city (A, ..., I) in a set of cities having predefined locations. When the number of cities in the set is large, the number of possible routes 10 (where each route is an ordered sequence of paths— e.g., 12, 14, ... —running from city to city) is extremely large. The TSP is one of a class of problems called combinatorial optimization problems because the goal is to optimize some combination of elements (e.g., the ordering of the paths that make up a travel route in order to discover the shortest tour). The number of possible tours grows combinatorially, or exponentially, with the number of cities. Thus, as the number of cities increases, it quickly becomes impossible to search exhaustively all possible tours and consequently more selective search strategies must be used.

In another class of optimization problems, called function optimization problems, the objective is to find the best solution, i.e., the multivariate solution yielding either the minimum or maximum value of a function, $f: R^n \rightarrow R$. For complex functions, these problems are not susceptible to solution by conventional mathematical approaches. In FIG. 2, for example, the goal may be to find the minimum value 16, and solution $P*$ corresponding to that value, of some function 18, $y=f(P)$, of the single variable P. We restrict our subsequent discussions, without loss of generality, to minimizations, i.e., optimizations for which the solution at the global minimum is sought.

One group of approaches to solving function optimization problems, called the homotopy methods, involve iterative techniques that begin with some trial solution and move (based on information about the slope or derivative of the function in the locality of that trial solution) through a succession of subsequent trial solutions such that the evaluation at each trial solution is smaller (in the case of function minimization) than the previous solution. Thus, at each iteration, the local homotopy methods impose a constraint on the maximum value of the function that may be considered in the next step.

In these so-called local homotopy methods, the iterative process may only move "downhill" (i.e., continually seek smaller values of the function), so that when the process reaches a minimum value, it is likely to be only a local minimum and thus not the desired global optimum. In FIG. 2, for example, if the initial trial solution is at point 20, a local homotopy method would proceed in the direction of arrow 22 until it reached point 24, a local minimum, and stop without ever reaching the "global" minimum value at point 16. In an attempt to avoid becoming "stuck" in a local optimum, the homotopy method may be repeated at many different and randomly chosen starting trial solutions. The trajectories (sequences of trial solutions) produced by the homotopy method in the localities of these initial solutions are followed downhill until local optima are found; the best of these local optima is chosen as the estimate of the global optimum. To be confident that these local homotopy methods have discovered the global solution, the search space must be carefully sampled which typically requires a great number of initial trials.

Global homotopy methods have also been developed that permit the iterative solution to proceed "uphill" at times in an attempt to avoid getting stuck at a local minimum. In this way, some types of local optima may be avoided, but there is no guarantee that the global solution will necessarily be found. Consequently, it is well-known that global homotopy methods, like local ones, require a large number of initial trials to assure that the global solution will be found.

Thus, while homotopy methods are especially effective at reaching the optimum solution quickly if they begin at a trial solution that is near to the optimum, most homotopy methods are subject to failure if they begin outside the "basin of attraction" (the region in which downhill motion will lead to a local optimum) of the optimum solution. And, of course, homotopy methods require derivative information and thus cannot solve problems for which "uphill" and "downhill" directions have no meaning. This lack of derivative information is typical of combinatorial optimization problems and, in particular, the TSP example which we employ later to illustrate the invention, lacks this information and hence cannot be solved by homotopy methods.

Another category of problem solving techniques, applicable both to combinatorial and function optimization problems, is the Standard Genetic Algorithm Optimizer (SGAO). SGAOs solve problems by providing a representation for the possible trial solutions and then proceeding through successive iterations to reach an optimal solution.

In a SGAO, the parameters of the function being optimized are represented by a population of so-called chromosomes. Each chromosome may be, for example, a string of bits (0s and 1s in the memory of a computer) with all chromosomes in the population having the same number of bits. Returning to the simple example of FIG. 2, and referring also to FIG. 3, where only one parameter P is to be optimized, the representation scheme may require that each chromosome be a three-bit binary number whose value points to the index of one of the eight possible discrete values of P, e.g., the three-bit number 010 would point to $P_2$. The number of possible discrete values of P is governed by the number of bits per chromosome. Note that, while we primarily discuss in this section a single parameter function optimization for simplicity sake, all of these techniques are applicable to multivariate function optimizations. In fact, many of the advantages of the invention are actually amplified in the multidimensional cases since then the search space sizes increase roughly to the power of the number of variables in the problems. This makes the spaces much more difficult to search by the conventional algorithms. In the case of multiple parameters, a chromosome then becomes a string of genes, where each gene is a string of bits representing one of the parameters. All of the parameters are thereby represented as genes of bit strings along the chromosome. In other words, the structure of the chromosome is unchanged (it is still a string of bits) but its bits are divided into genes representing the various parameters of the problem. This allows the same operators and measurements to be applied to either whole chromosomes or separate genes without significantly altering them. Later, when we discuss gene measurements, we simply mean the same measurements as defined for the chromosome but applied to individual genes along the chromosome.

In each iteration of the process, a SGAO explores the "chromosome space" by manipulating the values of at least some of the chromosomes (unlike the local homotopy methods which explore the "solution space" directly). The ultimate goal is to have all of the chromosomes of the population converge to the same value, namely the one corresponding to the $P_i$ at which the function is at a minimum ($P_2$ in FIG. 2). Note that $P_2$ is not the true global solution $P*$; $P*$ "falls between the cracks" of the discrete trial $P_0$-$P_7$ which often leads to difficulties for these algorithms.

There are two principal ways of manipulating the chromosomes during a given iteration (called a generation). One way, mutation, switches the values of bits in each one of a number of randomly selected bits from all chromosomes of the total population of chromosomes. In the other way, crossover, certain chromosomes are selected from the population for mating (to be explained below) with other selected chromosomes. Whether a given chromosome is selected for mating depends on the corresponding value of the function being optimized. For example, in FIG. 3, the first chromosome of the population may not be chosen for mating because it corresponds to a very high (i.e., poor) value of the function being optimized, while $P_3$ would likely be chosen for mating because it has a good (i.e., low) value.

We now define and discuss the crossover operator that produces the mating results from two selected chromosome parents. It is the crossover operator that leads to the extraordinarily quick discovery of early approximate solutions (typically much faster than other algorithms including homotopy methods, Monte Carlo, and simulated annealing techniques). It is also this operator that is primarily responsible for the very slow late refinement of approximate solutions—a disadvantage that, as we shall see, the invention eliminates.

Referring to FIG. 4, in one possible example of mating, $P_3$ and $P_4$ are crossed over by combining, in one offspring 24, the highest-order bit of $P_3$ with the lower order two bits of $P_4$, and combining in a second offspring 26, the highest-order bit of $P_4$ with the lower-order two bits of $P_3$. Of the two offspring, $P_0$ is the better; subsequently $P_4$ may not be selected for crossover and may eventually be eliminated, while $P_0$ may be selected for crossover and thus continue to contribute its chromosome bits to later generations. Note that the highest-order bit 0 of this retained chromosome is the "correct" highest-order bit of the optimum solution $P_2$; crossover has the effect, in early iterations of the process, of propagating to later generations the highest-order bit of the optimum solution. In this manner, the crossover operation "finds" the higher-order bits early on and "remembers" them by storing them in the higher-order bit positions of the chromosomes.

This need to "remember" the higher-order bits while continuing to search for the lower-order bit values leads to an inefficient search for those bits and ultimate breakdown of SGAOs treating complex problems. As we shall see, the invention, on the other hand, eliminates this need for the chromosomes to "remember" these bit values by simply extracting, when appropriate, this information from the chromosomes, conceptualizing it, and storing it within an adaptable translational mapping (to be described). This frees the chromosomes in conjunction with crossover to perform at maximum efficiency during their entire search, alleviating this disadvantage inherent in SGAOs.

Returning to the example, the searching performed by crossover is a binary search in that the highest-order bit of the chromosomes corresponds to a bifurcation of the function in FIG. 2 at the line 28; the next to the highest-order bit corresponds to bifurcations at the lines 30, 32 (and also at line 28); and the lowest order bit to bifurcations at the lines 34, 36, 38, 40 (and also at lines 28, 30, 32).

The search space represented by the chromosomes is multidimensional, e.g., three-dimensional in our case of three-bit chromosomes. One may define so-called hyperplanes within that multi-dimensional space such that, e.g., all of the chromosomes having a '1' as the highest-order bit lie on a first-order hyperplane (literally a two-dimensional plane in the example) while all of the chromosomes having a '1' as the highest order bit and a '1' as the lowest-order bit would lie on a second-order hyperplane (in this case a line). Thus it may be said that the mutation and crossover operations in successive iterations in effect endeavor to find the hyperplanes of the chromosome space that combine to form the representation of the optimal solution of the solution space. In other words, the hyperplanes are the building-blocks of the solution which the operators of the SGAO attempt to discover.

Even near the end of the search, as the chromosome values are converging toward the solution, the SGAO continues to search the entire range of values of $P_i$. This is the case simply because mutation and crossover can produce offspring that have any arbitrary bit values and therefore all possible offspring span the entire search space.

One effect stemming from the representational scheme by which the chromosome values represent the indices of Pi is the so-called "Hamming cliff" effect. As an example, suppose the minimum value of a function occurs at the fourth parameter value (binary 011), but the SGAO has found its way to the fifth parameter value (binary 100 ) which is near to the optimum in terms of the functional value but far away in terms of Hamming distance (the Hamming distance between two chromosomes is the number of non-identical corresponding bit positions. e.g., 011 and 100 have the maximum Hamming distance of 3 while 011 and 001 have a Hamming distance of 1). For a SGAO to move from the fifth parameter to the correct solution at the fourth value would require either three specific single mutations or a particular crossover and a simultaneous mutation. Either sequence of operations is extremely unlikely because the mutation and crossover operators are triggered probabilistically. Attempts to avoid Hamming cliffs by using a Gray coding scheme in place of the binary code render the crossover operator far less efficient in searching the chrosome space for possible solutions. Note that, in a SGAO, the representational scheme by which the value of a given chromosome is linked to a corresponding parameter value (e.g., through the binary code or through a Gray code) does not change from iteration to iteration during execution.

It is characteristic of a SGAO that it, in effect, searches the solution space (i.e., the range of possible solutions—values of the parameter upon which the function y depends in the case of FIG. 2) relatively quickly during early generations. So quickly, in fact, that SGAOs often become stuck in local optima. This effect, termed premature convergence, occurs because one individual chromosome from the randomly chosen initial population of chromosomes will almost always be "better" than the rest. The progeny of this super-individual quickly take over the population, driving out the offspring from the other, poorer, chromosomes from the initial population. The SGAO has become stuck at the solution represented by the super-individual, even though the super-individual does not represent the globally optimal solution. After premature convergence occurs, the SGAO is incapable of efficient further search of the solution space. In the case of FIG. 2, for example, a SGAO would likely converge on $P_3$ as the solution even though the optimum value of the function y is at point 16 and $P_2$ is the closest trial solution.

Because a SGAO is more efficient in earlier iterations, when the trial solution may not be near the optimum solution, while homotopy methods are more effective when the trial solution is close to the optimum, it has been proposed to switch from a SGAO to a homotopy method at some point in the process of solving a problem. This strategy, however, has difficulties because if the switch is made too early, the homotopy method will drive the trajectory of trial solutions to a local optimum, while if the switch is made too late, the increased efficiency of the homotopy method is lost.

In summary, referring to FIG. 5, in a SGAO 35, evaluations 29 of individual trial solutions 31 produce corresponding payoffs 30 that are used by the SGAO to control genetic alogorithm (GA) operators 34 (selection, crossover, and mutation) which determine the next generation of chromosomes in the chromosome population 36. The new generation of chromosomes are converted by a fixed translation 38 into new trial solutions 32 for evaluation. The process repeats in the next generation. The structure of the chromosome space and the translation together make up a representational scheme 40 that is predefined and does not change from generation to generation. The SGAO is thus solely an evolutionary (i.e., Darwinian—random mutation with survival and mating of the fittest) technique in that information is passed only in the direction from the chromosome population to the trial solution population (and to the GA operators as payoffs of individual trial solutions). Although representations of the solution are stored in the bits of the chromosome population, the SGAO never alters the representational scheme.

Referring again to FIG. 2, in the representational scheme for function y, each chromosome in the population always has three bits, and the translation between the eight possible values of the chromosome (illustrated by the markers labeled $P_0, \ldots, P_7$) is always fixed. That is, a chromosome whose value is 000 is always translated to the parameter value $P_0$ (and in turn to corresponding functional value $y_0$).

It is well known that the method of representing the trial solutions of the space of all possible solutions is most important to any particular algorithm's success in searching that space. For complex problems, there is usually no known best representation. But even beyond not knowing the best representation, we have discovered, and the invention takes advantage of the fact, that for interative improvement algorithms the best representation changes as the trial solutions are discovered or refined. Whenever the user chooses a representation to employ with a traditional search algorithm, that choice has associated search biases that affect the performance and accuracy of the method and may even lead to its failure. There are numerous well-known (and even named) albeit subtle, problems stemming from the representational issues; several of these unfavorable characteristics are discussed below.

SUMMARY OF THE INVENTION

The ARGOT (Adaptive Representation Genetic optimizer Technique) strategy of the invention mitigates many of the detrimental effects of the aforementioned representational issues by dynamically adapting, in a statistically unbiased fashion, the representation to the specific problem being solved. This frees the user to choose a relatively poor (and typically unknowingly poor) initial representation because ARGOT will improve upon this choice. Later examples will illustrate this capability. Thus, the invention solves optimization problems accurately and efficiently without premature early convergence or slow late convergence, and can overcome flaws in the original representational scheme of the trial solutions.

As a general feature, the invention provides an optimization method for finding the best solution to a problem of the kind for which there is a space of possible solutions; in the method, tokens (e.g., chromosomes) take on values that represent trial solutions in accordance with a representational scheme that defines the relationships between given token values and corresponding trial solutions; by an iterative process, the values of the tokens are changed to explore the solution space and to converge on the best solution; and for at least some iterations, characteristics of the tokens and/or the trial solutions are analyzed and the representational scheme for later iterations is modified based on the analysis for earlier iterations without interrupting the succession of iterations.

Preferred embodiments of the invention include the following features. The representational scheme defines characteristics of the tokens, and the modifying step includes adjusting those characteristics. For example, the tokens each comprise a string of characters, the representational scheme defines the number of characters in the string (the number corresponds, e.g., to the resolution with which the values of the tokens represent possible solutions), and at least one operator is invoked for adjusting the number of characters in order to change the resolution. In some embodiments, the operator is invoked on the basis of a measurement of convergence of the population of tokens.

Preferred embodiments also include the following features. The representational scheme includes an adaptive translation mapping for converting values of tokens to corresponding trial solutions, and at least one operator may be invoked for changing the adaptive translation mapping. For instance, an adaptive translation mapping may define upper and lower boundaries on the trial solutions and the operators may change at least one of the boundaries, for example by dithering (i.e., making random small changes in) the boundary, shifting the boundary towards lower or higher values, or shifting both boundaries further apart or closer together.

Preferred embodiments also include the following features. The step of analyzing characteristics of the tokens includes applying various statistical measurements across a population of trial solutions or a population of tokens or both. For example, the measurements may be the convergence, or similarity, of the tokens, or the first, second, or fourth moments of the trial solutions. The operators may also include (i) an elitist operator which stores information about the token representing a favorable possible solution in one iteration, and reimparts the information to a population of tokens in a later iteration; (ii) another elitist operator that adjusts the adaptive translation mapping to assure that information is not lost from one adaptation procedure to the next; (iii) a homotopy optimizer operator which adjusts trial solutions forming trajectories leading to local optima for each token of the population; (iv) a biased sampling operator, such as a metropolis mutation operator, to weight the random sampling procedure towards better trials; an annealing schedule operator; (v) split and join operators to split the population of tokens into subsets and rejoin subsets of the population of tokens. The convergence measurements are used to trigger the dither operator, the resolution operators, a homotopy optimizer operator, and/or an annealing schedule operator. The position measurements (first moment) trigger a shift left operator or a shift right operator. The variance measurements (second moment) trigger an expansion operator, a contraction operator, a homotopy optimizer operator, and/or an annealing schedule operator. The fourth moments trigger the splitting or joining operators. User specified thresholds and factors control the operators, and the user may also apply operators to subportions of the tokens (e.g., genes of chromosomes on a subportion by subportion basis.

Another general aspect of the invention provides a method for selectively implementing at least two different problem solving algorithms, each algorithm being of the kind in which one or more trial solutions are represented by one or more tokens in accordance with a representational scheme, and the desired solution is reached by an iterative procedure where in each iteration one or more operators may be applied to change either the token or the trial solutions. The method provides a set of available operators, and enables the user to select from the set of available operators a subset of operators for implementing a chosen algorithm. This aspect we term the ARGOT Framework.

Preferred embodiments of the invention include the following features. The one or more tokens sample a space to be searched to reach the desired solution, and the method includes enabling the user to define a single consistent space to be searched by more than one problem solving algorithm. The search spaces within the ARGOT Framework have the same sizes for all of the algorithms. The user is enabled to implement a succession of different algorithms using the consistent search space, and the user is provided with comparable information tracking the operation of the different algorithms. The tracked information includes at least one of the following: the relative number of iterations required by the different algorithms to reach a solution; the solutions reached; or the sequence of trial solutions traversed. The operators include at least random mutations, homotopies, and crossovers, and the algorithms include at least Monte Carlo, simulated annealing, homotopy, and genetic algorithms. The operators may also include operators that alter the representational scheme based on measurements of the search space and/or the trial solutions.

The ARGOT scheme is relatively insensitive to the context of the problem and the representational scheme applied to it. Either a binary coding or a Gray coding scheme may be employed with impunity, for their usual disadvantages are ameliorated by the ARGOT mapping. For instance, the Hamming cliff problem arising with a binary code is avoided. Extremely small search spaces at appropriate generations lead to very fast searches and accurate results. Mutation may be applied as a search strategy as well as an insurance policy to avoid allele loss at a bit position. The technique is relatively insensitive to settings of internal variables and to the initial trial solutions. No a priori information about the solution is needed. Premature convergence of the token population is avoided. The search for the solutions is efficient, and the chromosomes are always left fresh to effectively explore the space that they span. The ARGOT program is numerically robust; unlike many iterative methods, such as homotopy techniques, roundoff errors at each iteration have almost no effect on the performance or accuracy of the ARGOT approach. In addition, the divergence problems associated with homotopy methods arising from vanishing derivatives do not occur for ARGOT. In our experience, ARGOT is less "greedy" than either simulated annealing or the SGAO—the ARGOT algorithm seldom becomes "stuck" at local optima and will even alternate between multiple degenerate global optima or, through the splitting operator, simultaneously pursue multiple global solutions. Because ARGOT in effect defines its own vocabulary in which to solve a problem, ARGOT also develops its own unique strategy of solution for each problem unlike the traditional search methods whose strategies are imposed upon them from the outset. For instance, when applied to different problem domains, ARGOT develops different, and appropriate, methods for searching the respective spaces. ARGOT also implements an appropriate strategy for switching from an enhanced genetic algorithm to a homotopy method based upon statistical measurements—as previously mentioned, this is a difficult task. ARGOT also implements an automatically adjusted annealing schedule for simulated annealing, again based upon statistical measurements over a population of simultaneously running simulated annealing algorithms. For complex problems it is recognized that the annealing schedule is the most difficult task for simulated annealing algorithms and is usually manipulated through manual intervention. The ARGOT Framework allows for the qualitative and quantitative comparisons of a number of different algorithms, including a variety of new "composite" algorithmic approaches, to be performed while searching identical spaces. In addition, ARGOT provides information, including statistical properties, on the progress of the optimization. This information may be employed in the analysis of the quality of the estimated solutions discovered as well as serve as a basis for the difficult task of developing the halting criteria. New and composite algorithms can be devised and tested. A broad range of real world problems can be addressed and solved.

Other advantages and features will become apparent from the following description of the preferred embodiment, and from the claims.

DESCRIPTION OF THE PREFERRED EMBODIMENT

We first briefly describe the drawings.

FIGS. 9, 10, 11, 12 are tables defining respectively SGAO operators and variables, ARGOT operators and variables, and measurements available in ARGOT, and other ARGOT variables.

FIGS. 17, 18 are examples of settings of variables for, respectively, SGAO and ARGOT operators.

Figure 27A:
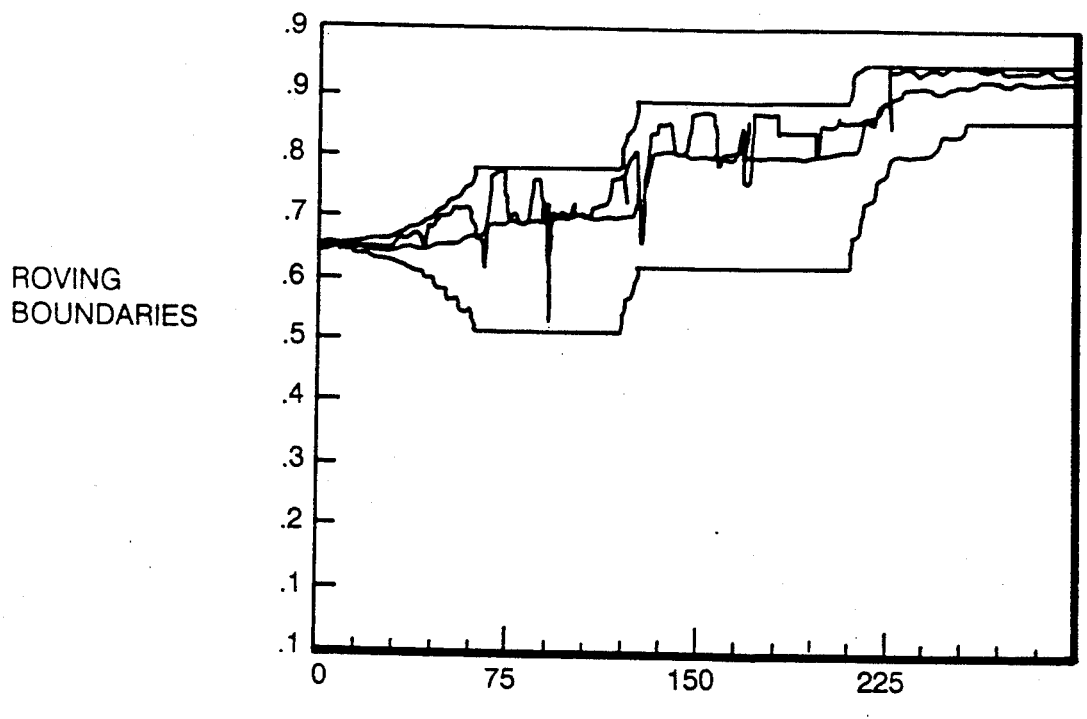
Figure 27B:
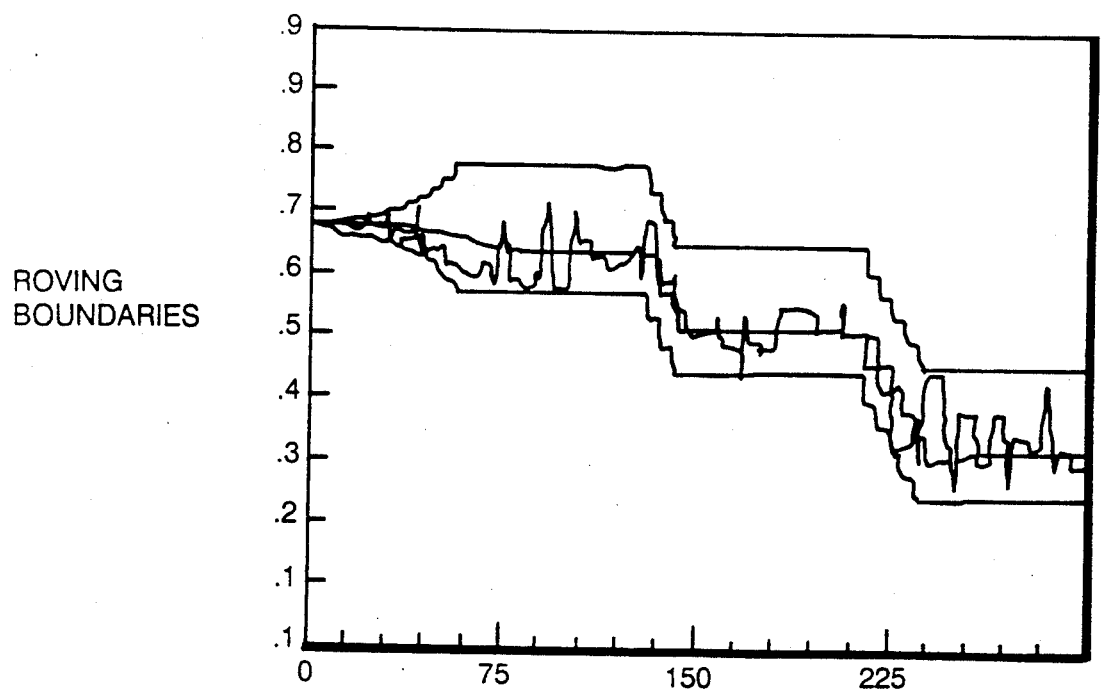

FIG. 27 includes charts of roving boundaries for cities 15 and 16 for an ARGOT solution.

Figure 28:
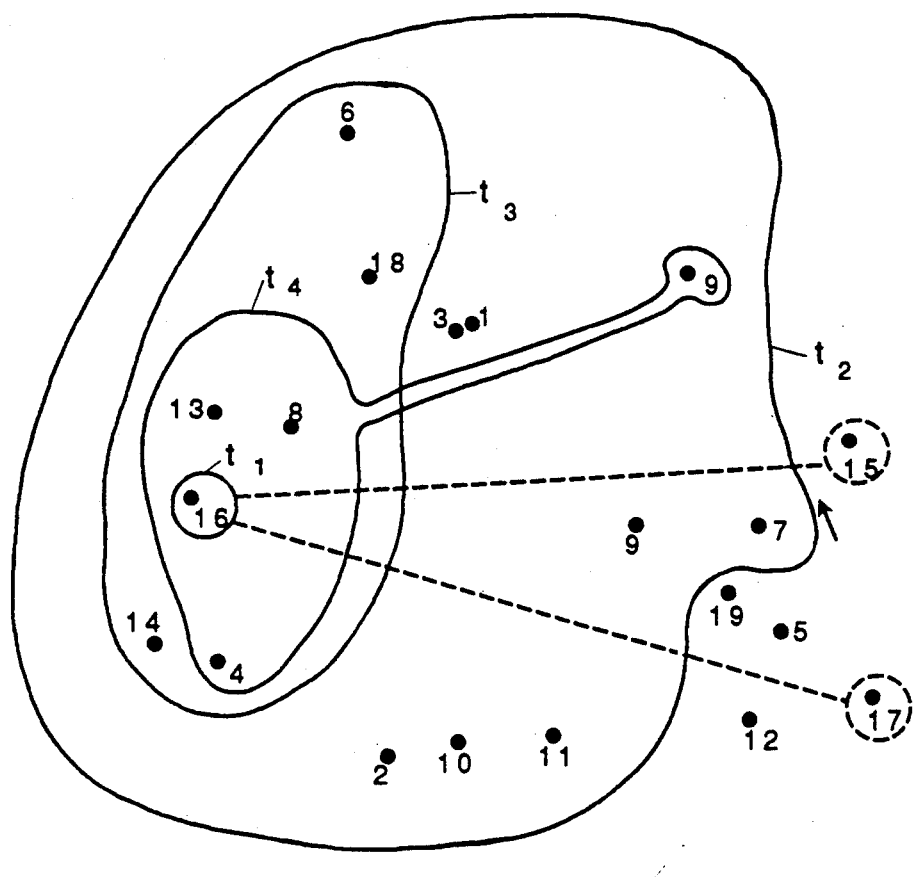

FIG. 28 is a diagram showing the interaction of other cities with city 16 in four stages of an ARGOT solution.

Figure 19:
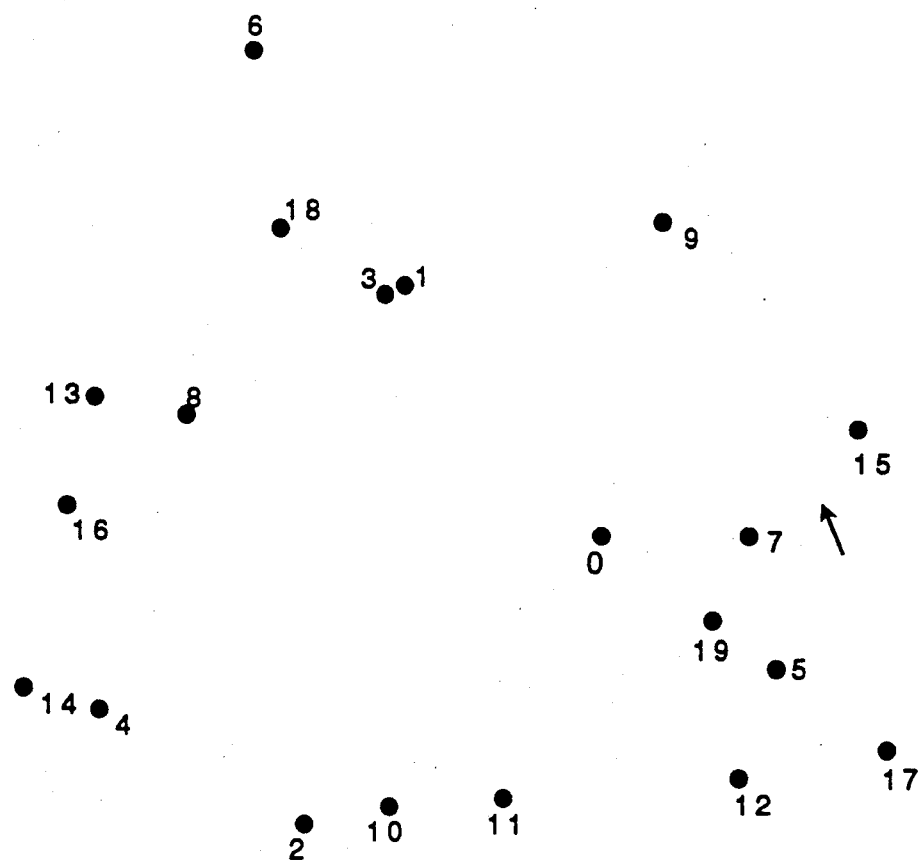
FIG. 19 is a map of cities in a traveling salesman problem.
Figure 29:
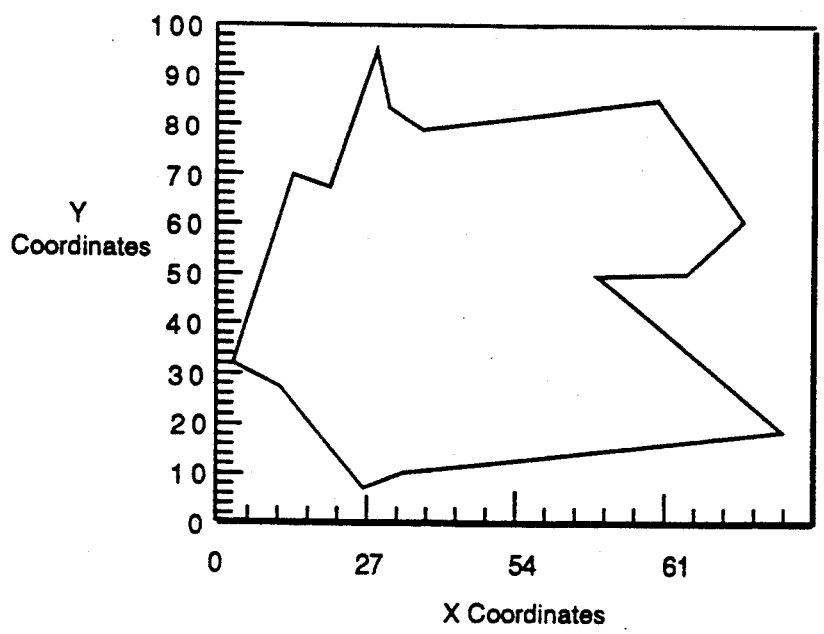

FIG. 29 is an optimal solution of the problem of FIG. 19.

Figure 30:
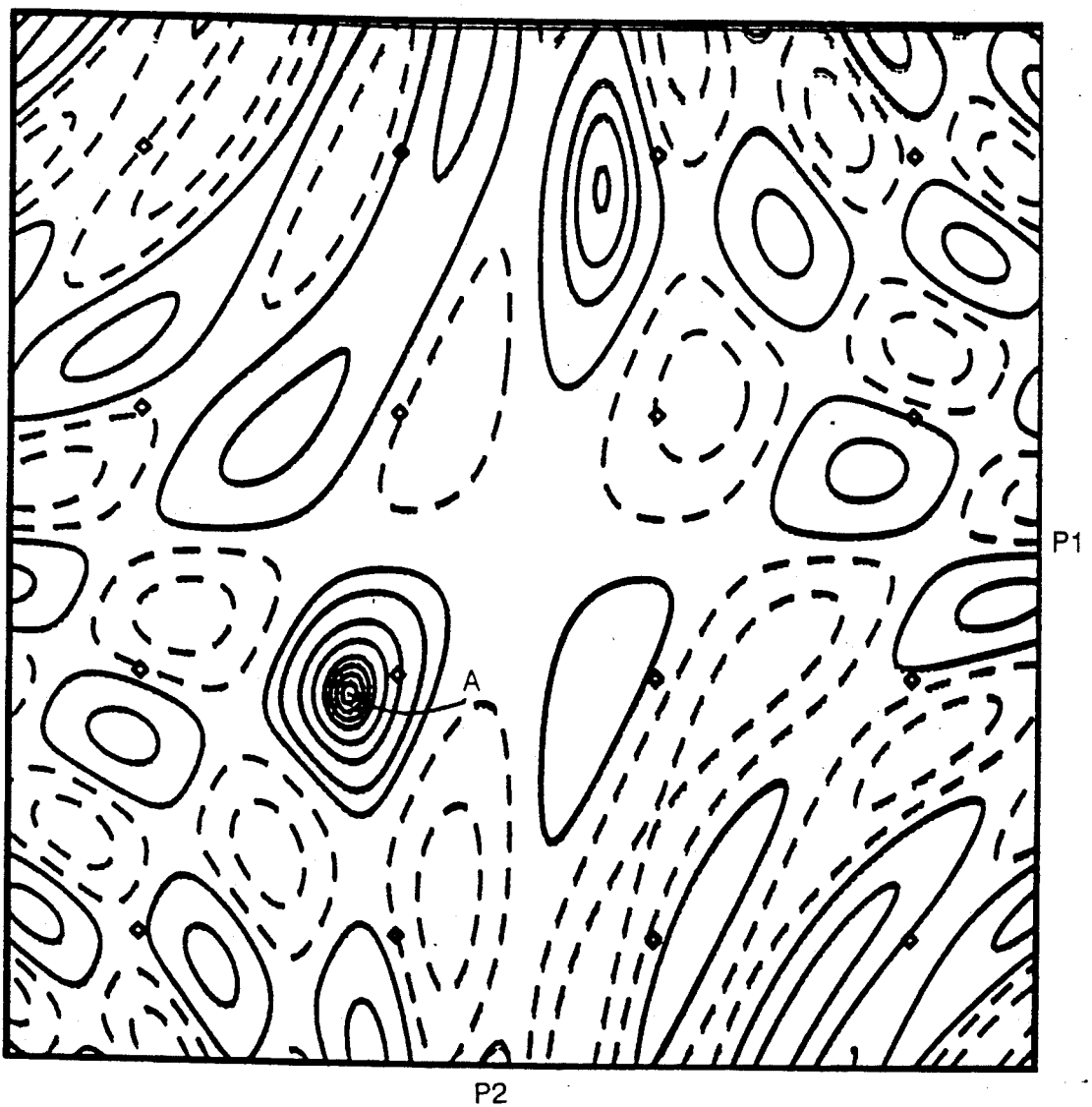
Figure 31:
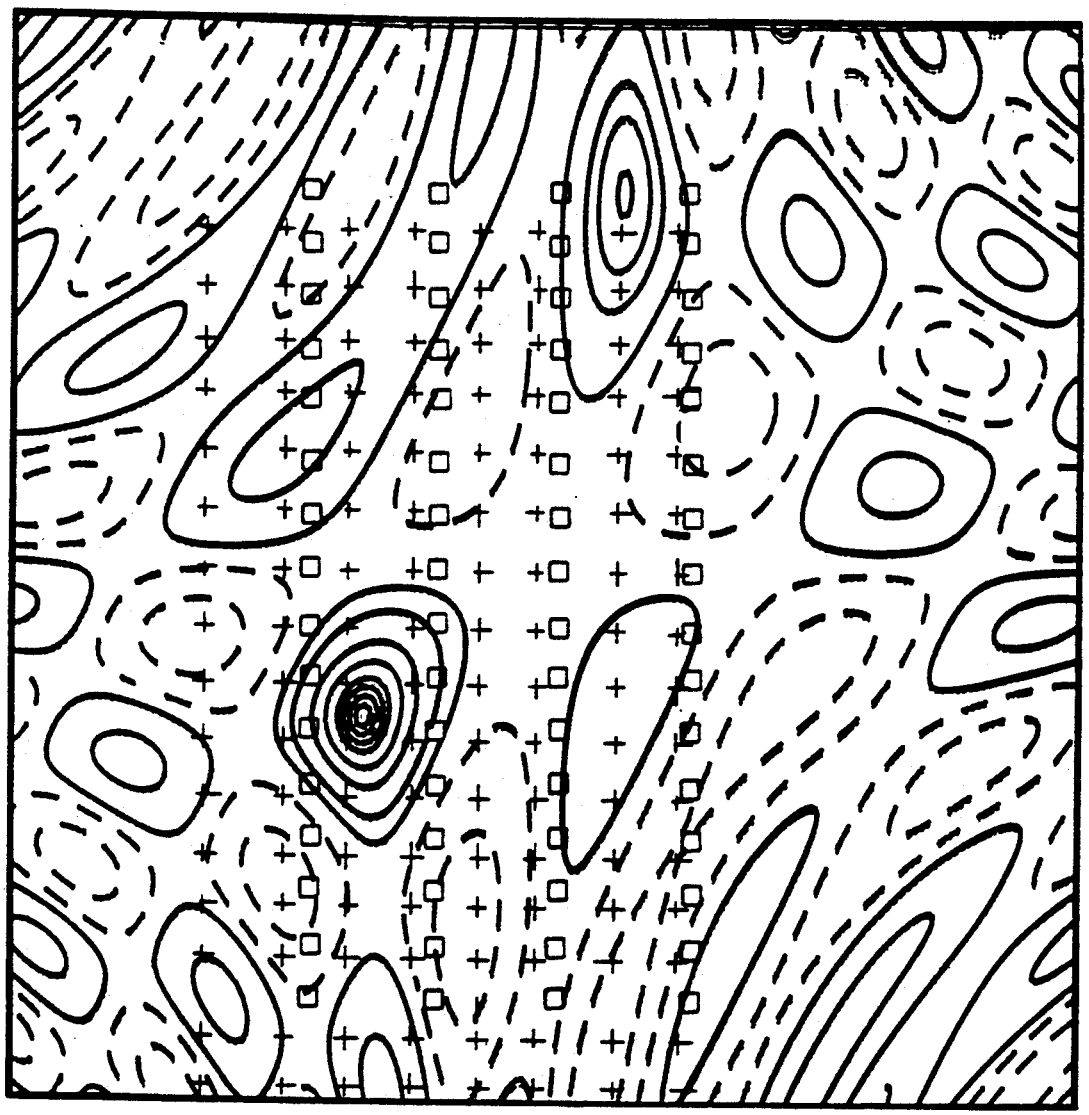
Figure 32:

FIGS. 30, 31, 32 are maps showing three stages in the solution of a function optimization problem.

FIG. 33 is a chart of algorithms and the operator used to implement them.

Figure 34:
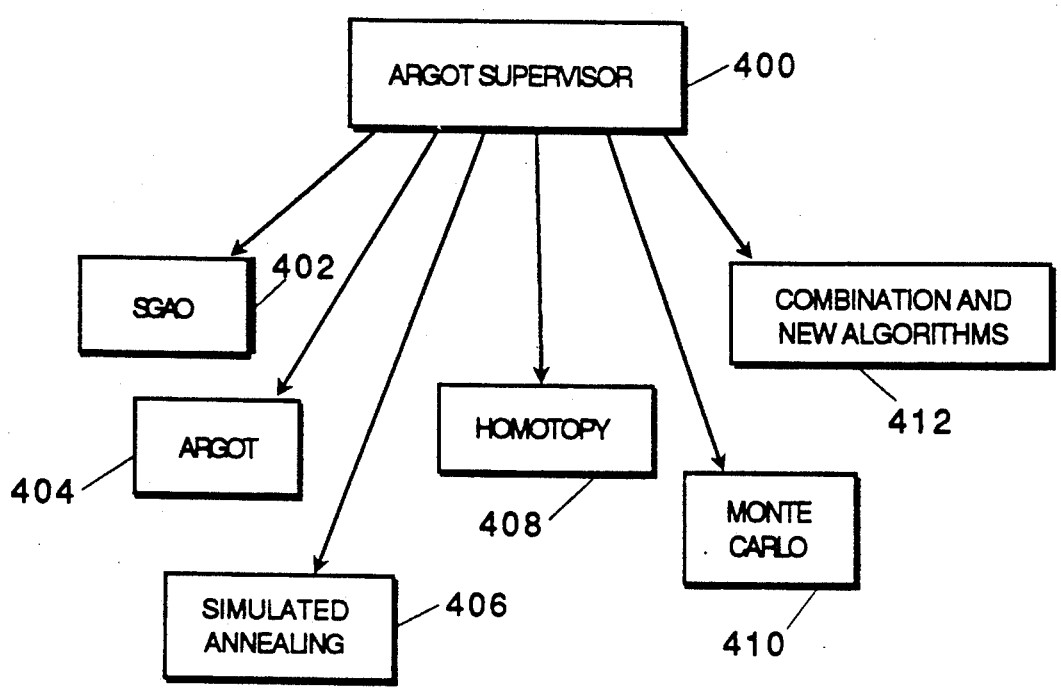

FIG. 34 is a block diagram of classes of algorithms that may be implemented in ARGOT.

Figure 35:
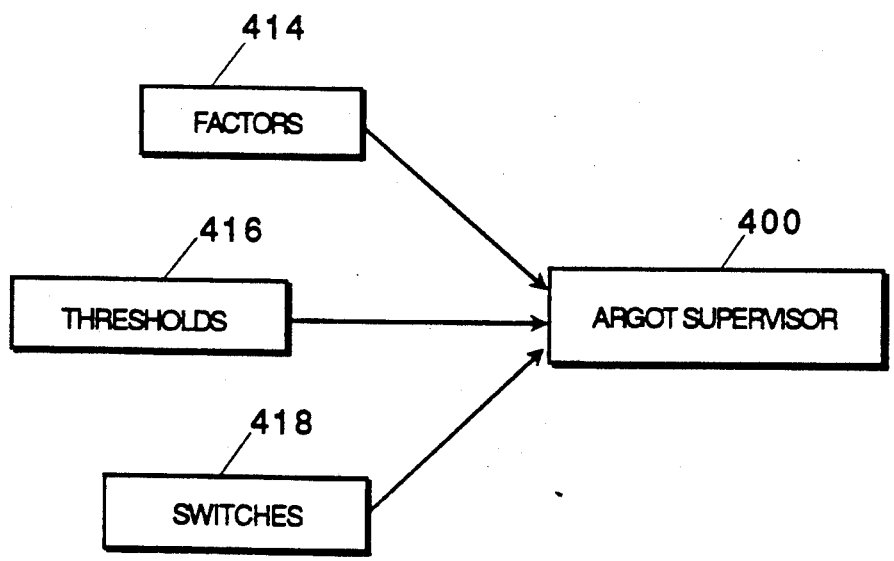

FIG. 35 is a block diagram of the user controls that may be applied to ARGOT.

OVERVIEW

In a preferred embodiment, the invention makes use of the SGAO but expands and modifies its capabilities to provide a far richer, and more effective, versatile, and efficient problem solving framework, while avoiding the deficiencies of SGAOs. Furthermore, the problem solving framework of the invention enables the user to compare the effectiveness of a variety of problem solving algorithms (e.g., SGAOs, simulated annealing, or homotopies) using a common set of criteria. When the underlying algorithm is a SGAO, the problem solving framework of the invention may be called ARGOT, or Adaptive Representation Genetic Optimizer Technique.

Figure 6:
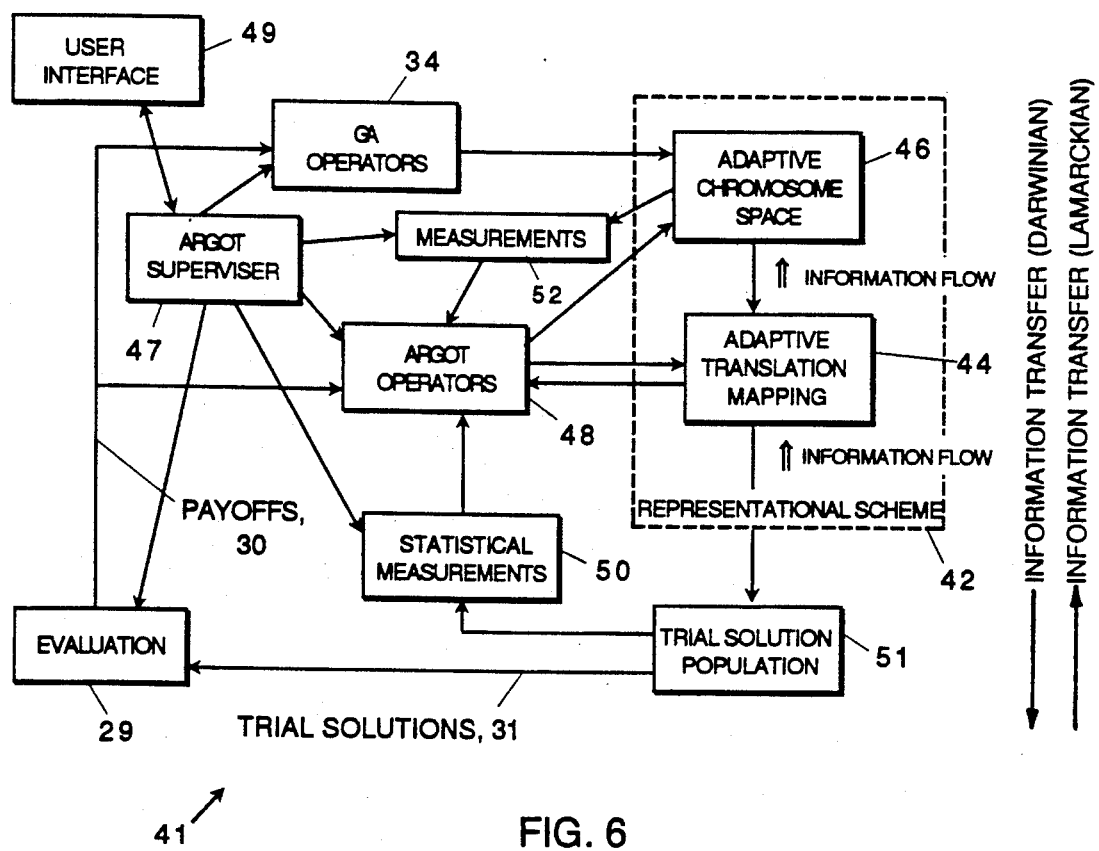
FIG. 6 is a block diagram of the ARGOT system.
Figure 5:
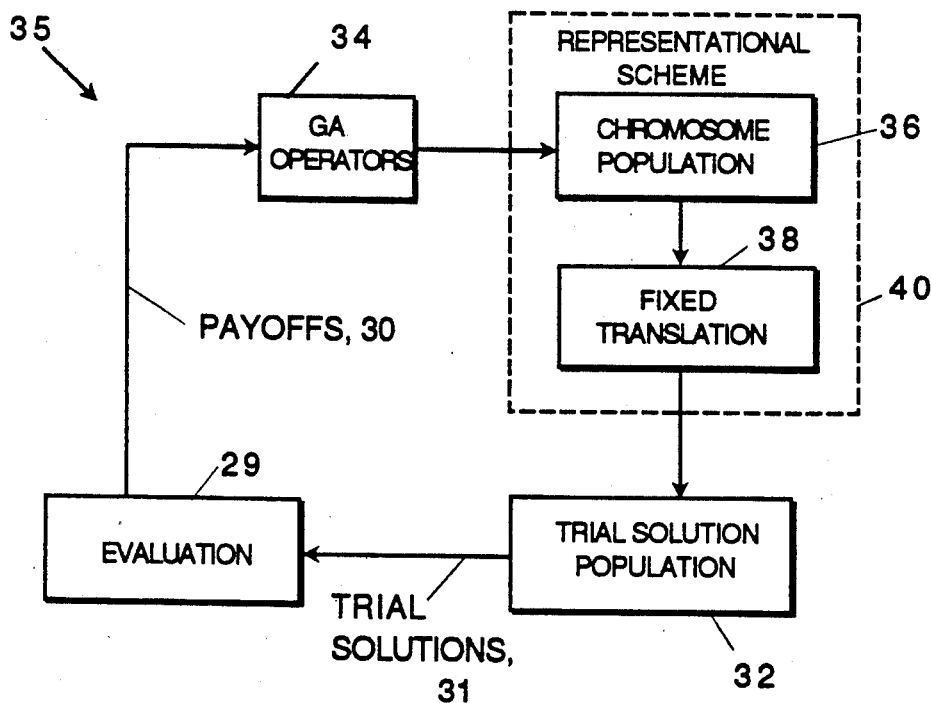
FIG. 5 is a block diagram of an SGAO system

Referring to FIG. 6, in the ARGOT system 41, the GA operators 34 continue to be available to operate on the chromosome population based on payoff evaluations 29 of trial solutions 31; and chromosomes continue to be translated to trial solutions again in a Darwinian (evolutionary) manner. But (1) in ARGOT's representational scheme 42, the translation is an adaptive translation mapping 44 that is changeable from generation to generation and the structure (e.g., the resolution) of the chromosome space 46 is also changeable, (2) special ARGOT operators 48 are provided to implement the changes in the chromosome space 46 and in the mapping 44, (3) operators 48 base their changes on statistical measurements 50 of the trial solution population 51 and on measurements 52 over the chromosome population, and (4) an ARGOT supervisor 47 linked to a user interface 49 manages the operation of the measurements and operators of the system. Thus, ARGOT is able to derive generalizations (i.e., learn, in a Lamarckian sense) about the chromosome and trial solution populations and to store what it learns in the representational scheme 42. As a result, ARGOT is able to provide rapid, efficient solutions to a wide range of optimization problems, including some that are unsolvable by a SGAO or by conventional homotopy methods. Note that the blocks of FIG. 6 may be seen as corresponding to hardware elements designed to carry out the system. For example, the chromosome space 46 could be implemented as a random access memory, and the statistical measurements as a digital processor.

ADAPTIVE REPRESENTATIONAL SCHEME

Figure 1:
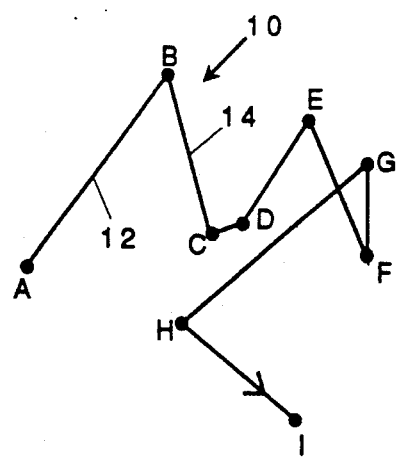
FIG. 1 is a diagram of a traveling salesman problem.
Figure 2:
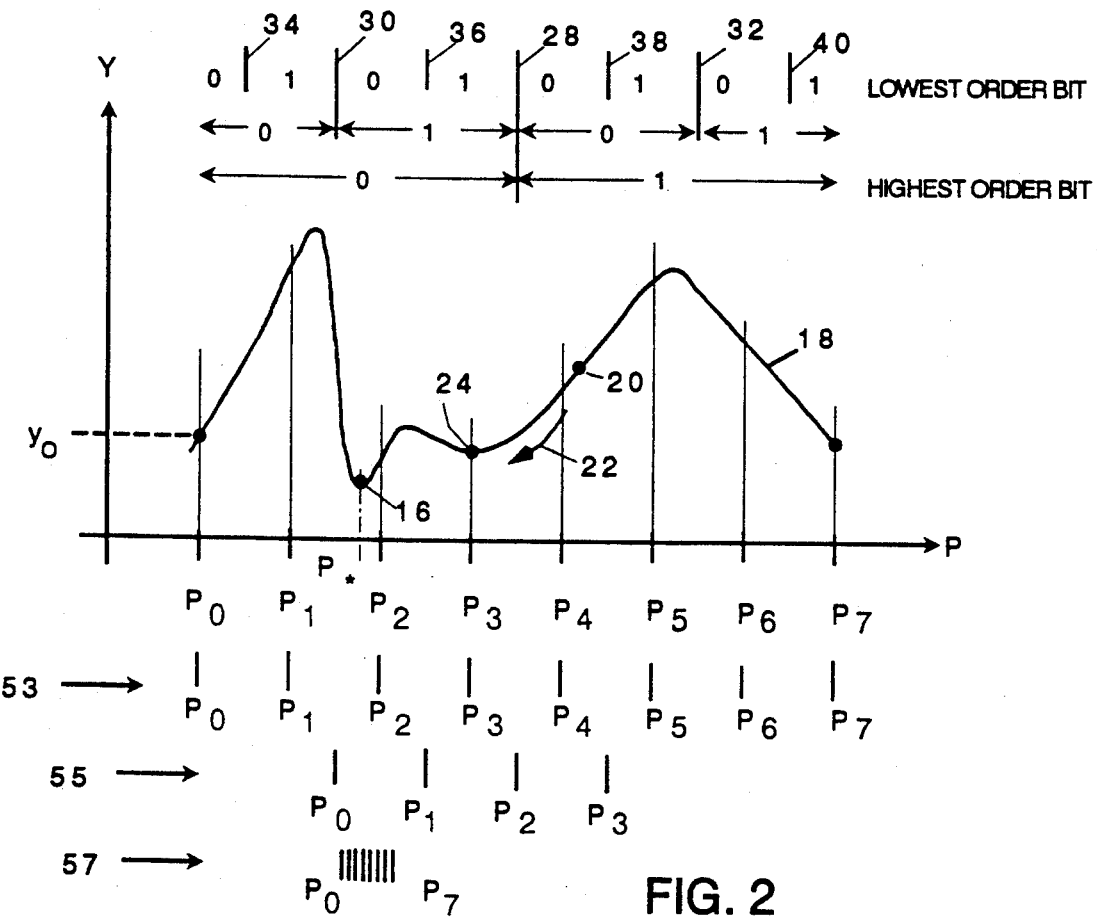
FIG. 2 is a diagram of a function optimization problem and aspects of solving the problem.
Figure 3:
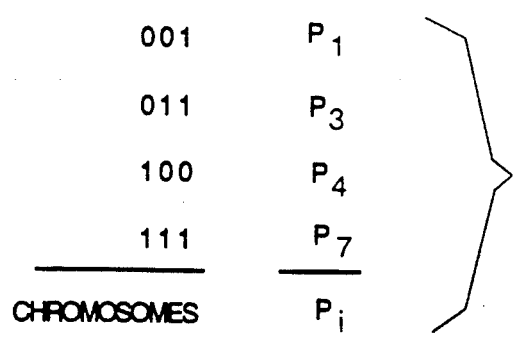
FIG. 3 illustrates a chromosome population.
Figure 4:
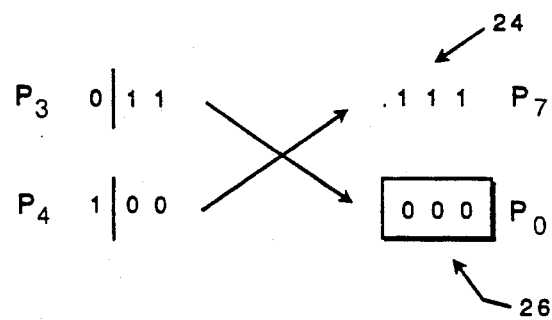
FIG. 4 is a diagram of crossover of two chromosomes.

Referring again to FIG. 2, as a simple example, the adaptive learning feature enables ARGOT to change the representational scheme such that in, e.g., the first generation, the population of chromosomes would all have 3 bits and lie on one or more of the marks labeled $P_0, \ldots, P_7$ in row 53, while in a later generation, the chromosomes could all have 2 bits and lie on one or more of the $P_0, \ldots, P_3$ marks in row 55, and near the end of the process, the chromosomes could again have 3 bits and lie on the $P_0, \ldots, P_7$ marks in row 57, which are clustered close to the optimal solution at $P_*$. Note that both the resolution of the chromosomes and the adaptive translation mapping change in both steps illustrated in FIG. 2. Recall that, by contrast, if a SGAO began with the representional scheme of row 53, that scheme would never change and the SGAO could never come nearer to the solution than trial $P_2$.

Figure 7:
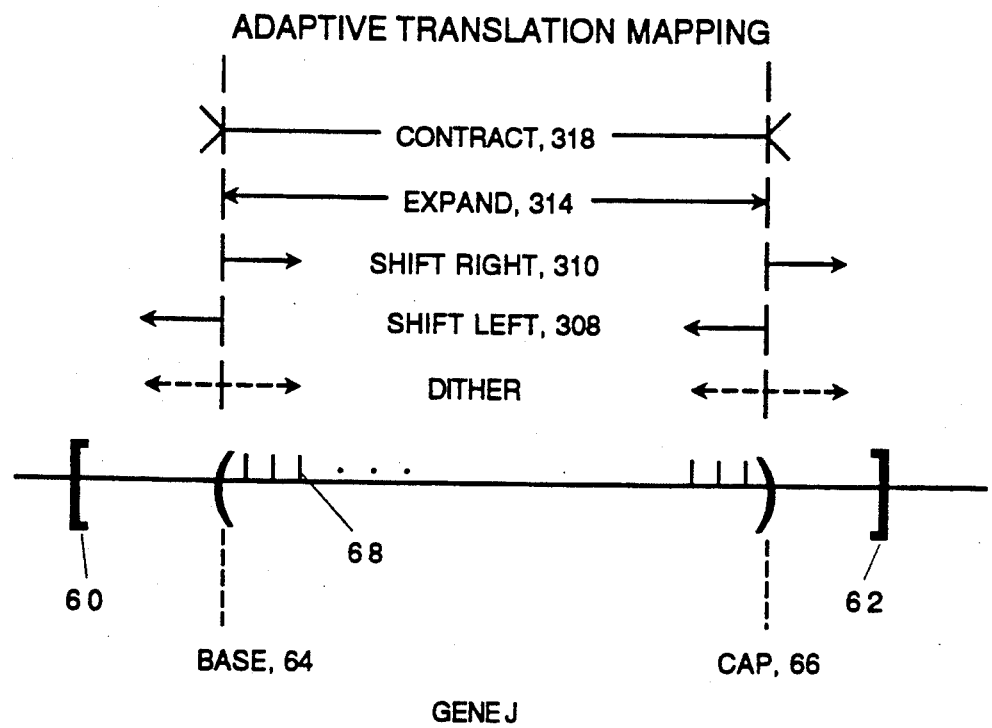
FIG. 7 is a diagram of an adaptive representational scheme.

Referring to FIG. 7, the values of a trial solution parameter to be optimized could range optionally from a minimum 60 to a maximum 62. (These would correspond, for example, to $P_0$ and $P_7$ in FIG. 2). In ARGOT, in a given generation, the representational scheme may provide that the range of parameter values to be represented by the span of possible chromosome values is somewhat narrower, e.g., from a base 64 to a cap 66. Between base 64 and cap 66, there are $2^k$ discrete evenly spaced parameter values 68 that may be represented by the possible chromosomes, where k is the present bit-length of the chromosomes. Note that in a given generation the chromosome population size is likely to be smaller than $2^k$ so that each mark 68 represents only a possible parameter, which may or may not correspond to an actual chromosome value in a given generation.

There are two primary aspects to the adaptive representational scheme. One, called roving boundaries, is the ability to focus the search on a succession of chosen limited regions of the trial solution space, by changing the locations of the boundaries 64, 66. The other, called resolution, is the capability of changing the fineness with which the chosen region of the solution space is searched by altering the number of parameter values 68 that are spread between the base and the cap.

ROVING BOUNDARIES

Within the framework of FIG. 7, the base 64 and cap 66 are the roving boundaries. The ability to adjust the boundaries of the space being searched provides a powerful mechanism, unavailable in SGAOs, for focusing the search performed by the chromosome population.

Because the SGAO uses a fixed translation between the chromosomes and the trial solutions, if the chromosomes of a SGAO only have a few bits, then the possible trial solutions ($P_0, \ldots, P_7$ in the example of 3-bit chromosomes) are few in number and consequently can be effectively searched. But when, as is typically the case, the small number of trial solutions must be spread over the entire trial solution space, the optimum solution is likely to fall between, not on, one of the trial solutions. (For example, in FIG. 2 the true minimum lies between $P_1$ and $P_2$ at point 16). For a SGAO to successfully avoid this problem, a great many trial solutions must be provided, and thus the chromosomes must be correspondingly long to represent those trial solutions; then the total number of chromosomes in the current population, say N=100, can provide only an extremely small sample relative to the number of all possible chromosomes, which may be as large as, say $2^K=2^{20}=1,048,576$ possible chromosomes of 20 bits each (K=20). The SGAO is not capable of effectively searching this larger chromosomal space using such a small population.

ARGOT, on the other hand, through adaptation of the representational scheme, has two mechanisms available to alleviate these unfavorable tradeoffs concerning the resolution: a small resolution means that the SGAO is capable of searching the space but the optimum will "fall between the cracks" while a large resolution means that the optimum will not be missed by a potential trial but now the solution space is too large for the SGAO to effectively search. First, ARGOT may reduce the resolution whenever it is not learning (convergence is high) thereby chunking the closely spaced discrete samples into a coarser mesh. At the coarser mesh it is easier for ARGOT to distinguish between the trial solutions, there are fewer potential trials, and ARGOT is effective at searching the smaller space. Once the best of the coarser values has been located (convergence is now low), ARGOT may then increase the resolution thereby allowing for a finer mesh to be sampled. This first mechanism of varying the resolution also works in unison with the second mechanism, described next, to provide an even more effective search. The second mechanism entails ARGOT's ability to focus on much smaller regions of the trial solution space. Instead of the trials being able to search the entire solution space, as in a SGAO, ARGOT narrows the search region based upon statistical measurements over the current trials via the adaptive translation mapping. Over this reduced sampling region, fewer discrete samples are needed, again leading to a lower resolution and its corresponding fewer number of potential chromosomes. The population of 100 chromosomes then forms a much better sample relative to the number of all possible chromosomes, say $2^8=2^8=256$ possible 8 bit chromosomes (K=8). Hence, ARGOT can very effectively search its smaller, adapted, chromosome space for the optimal solution. Furthermore, ARGOT does not allow the optimal solution to fall between the cracks since the translation mapping is adjusted so that a new trial parameter will be closer to the optimal solution than the old trial parameters (see, e.g., the progression of possible trial parameters from 53 to 57 in FIG. 2).

The representational scheme illustrated by FIG. 7 may be expressed by the following equation that relates a given chromosome value to a corresponding parameter value:

Parameter Value = Base + Chromosome Value*Increment, where Increment is $(Cap-Base)/(2^k-1)$, where k is the number of bits along the chromsome representing the trial parameter.

RESOLUTION

As already mentioned, in searching a particular region of the trial solution space, the length of the chromosomes can be varied by adjusting the so-called resolution. If K is the number of bits in the chromosome, $2^K$ is the number of possible chromosomes that are spread across the region of trial solution space within the roving boundaries of FIG. 7. Thus, if the region is small, relatively short chromosomes can effectively search the region quickly. Adjusting the resolution, among other things, reduces the number of generations needed to reach the solution. The basis on which the resolution is adjusted is described in more detail below.

OPERATORS AND MEASUREMENTS

Figure 8:
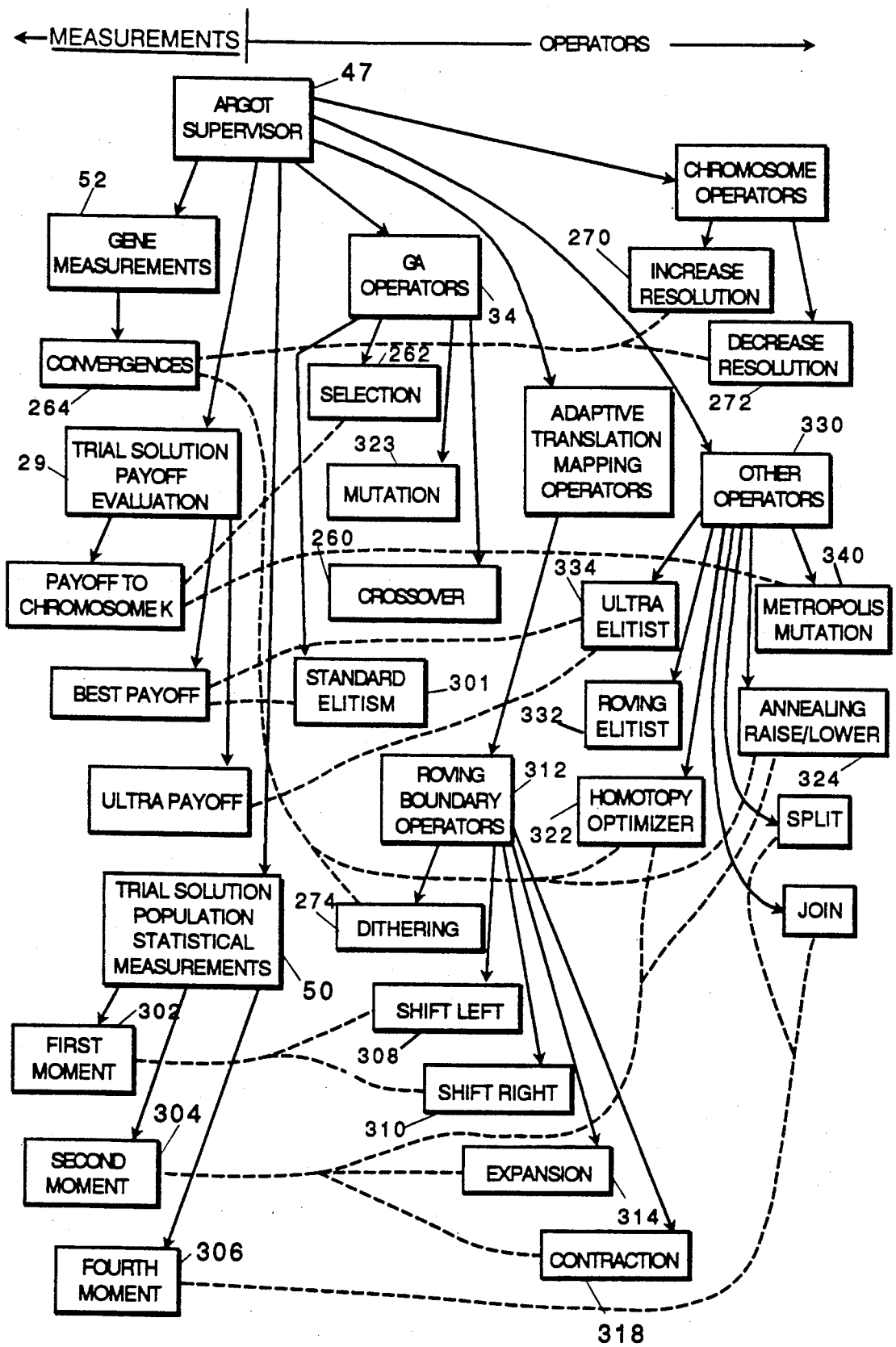
FIG. 8 is a block diagram of the measurements and operators available in ARGOT.

Referring again to FIG. 6, and also to FIG. 8, the ARGOT supervisor 47 has available a range of GA operators 34, special ARGOT operators 48, chromosome and gene measurements 52, trial solution payoff evaluations 29, and trial solution population statistical measurements 50. Dashed lines indicate relationships between operators and the measurements that trigger them.

Referring also to FIGS. 9 and 10, the operators and measurements are defined in terms of the conditions that trigger them (typically based on one of the measurements), and the variables associated with them. In FIG. 10, note that for each operator, it is possible to specify how often it is applied, by specifying a value, e.g., $R_t$ for resolution operators. Then for every, e.g., third, generation (if $R_3=3$) i.e., when mod $(t,R_t)=0$, the operator will be applied. FIG. 11 defines the measurements and their domains, and FIG. 12 defines certain variables.

As seen in FIGS. 8 and 9, ARGOT makes use of the conventional SGAO operators that effect crossover 260, selection 262, and mutation 323.

MEASUREMENTS

The population measurements, FIG. 11, include measurements of (i) the uniformity of the representation of each gene as well as the entire chromosome across the population (convergence 264—[$M_C$]), (ii) the positioning of the current best estimated parameter value within its roving boundaries 302 [$M_P$], (iii) the variance 304 across the population of the trial solution parameter values with respect to the size of the current trial domain, [$M_V$], and (iv) the multimodality 306 across the population of trial solution parameter values, [$M_{mod}$]. The convergence measurements are made on the binary representation of the parameters, i.e., in the chromosome space. The positioning and variance measurements, on the other hand, are made on the parameter values themselves, i.e., in the trial solution space.

In general, the nature of the operator being triggered determines which type of population measurement should be employed. For instance, any operator or corresponding variable that affects the hyperplanes should be triggered or modified by a measurement that provides information concerning the hyperplanes. Thus, if an operator alters the average schema length (A schema is a collection of hyperplanes, some having definite values and others left unspecified. Thus 1#1, 10#,and #1# are three different schema; the '#'s mean that the bit values are unspecified and thus may be either 0 or 1. The schema length is the number of bits between and including the first specified value and the last specified value of the schema along the chromosome; 3, 2, 1, respectively, for the above schema examples.) available (e.g., the resolution, crossover, and mutation operators control the average schema length), then convergence measurements are appropriate because they provide information on how well, on average, those schemas are currently known. On the other hand, the shift, expand, and contract operators are altering the roving boundaries of the translation mapping which directly affects the parameter space and hence it is appropriate to use the parameter space measurements of positioning and variance to trigger these.

CONVERGENCE

ARGOT generates a normalized convergence value between 0 and 1 that reflects the degree of similarity of the chromosomes in the present chromosome population (convergence is 0 if all chromosomes in the population have the same value, e.g., 001; convergence is 1 if the chromosome values are completely random). The convergence measurement is $<\epsilon>$:

$$<\epsilon_i> = 1 - \frac{|2n_{0i} - N|}{N}$$

where $n_{oi}$=number of 0s across the population at the ith bit position and N is the total number of chromosomes in the population.
Then $$<\epsilon> = \frac{\sum_{i=1}^{K} <\epsilon_i>}{K}$$

where K is the number of bits in a chromosome.

Figure 13:
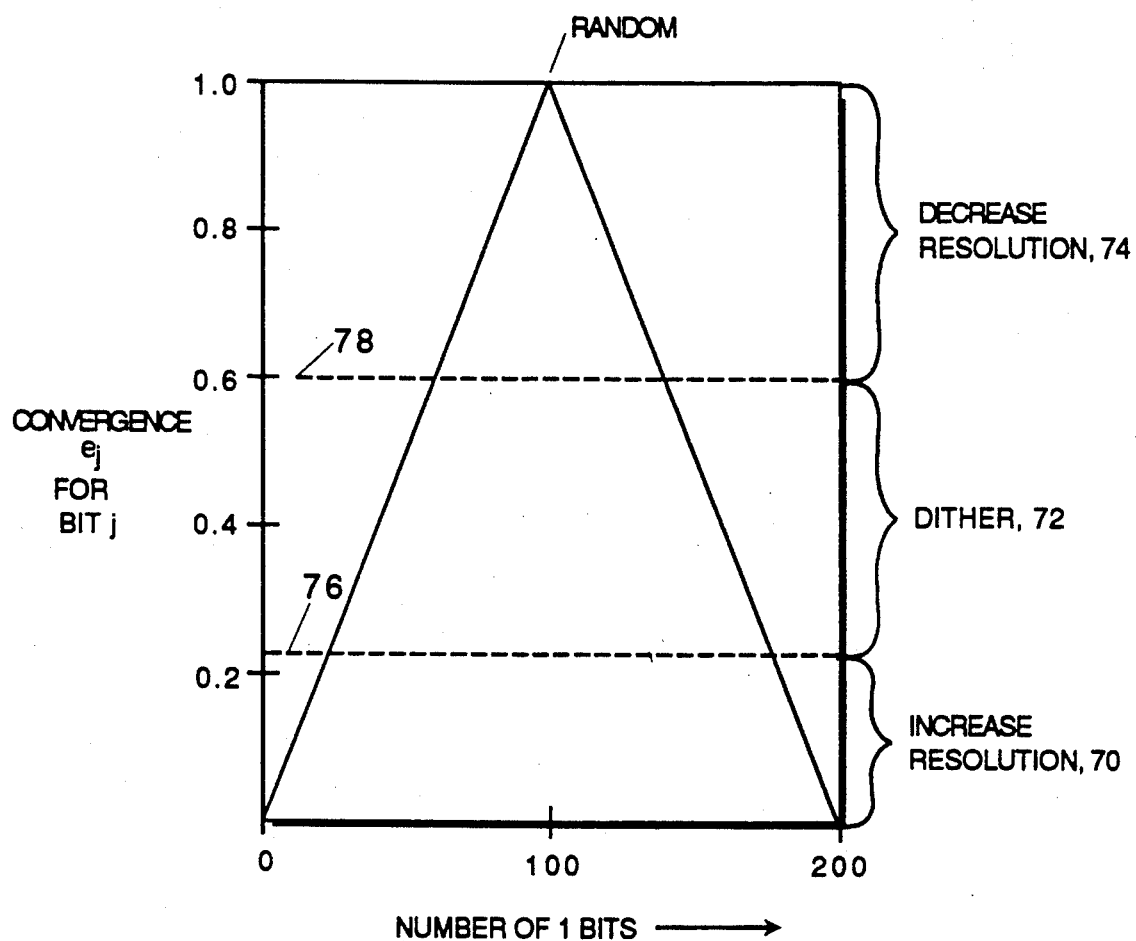
FIG. 13 is a diagram of the relationship between the convergence measurement and corresponding operators.

Referring to FIG. 13, for the jth bit of a chromosome, given a population of 200 chromosomes, the convergence value $\epsilon_j$ ranges from 0.0 if either $n_j=0$ or $n_j=200$ (where $n_n$ is the number of 1-valued bits in the jth positions of the 200 chromosomes), to $\epsilon_j=1.0$ where $n_1=100$ (i.e., there are equal numbers of 0s and 1s in the jth bit position). Depending on which of three ranges 70, 72, 74 the convergence value falls within (defined by an $\epsilon_j$ maximum threshold 76, and an $\epsilon_j$ minimum threshold 78), ARGOT will apply one of three operators: decrease resolution (262, FIGS. 8, 10) if convergence is above threshold 78, increase resolution (270, FIGS. 8, 10) if convergence is below threshold 76, and otherwise dither (274, FIGS. 8, 10).

Referring again to FIG. 7, decreasing resolution is achieved by reducing the bit length (k) of the gene, thus reducing the number of discrete values, $2^k$, between base 64 and cap 66. Resolution is increased by increasing the bit length and hence the number of discrete parameter values covered. In dithering, the base and cap are adjusted slightly by small random amounts.

The total convergence of the chromosome population is simply defined to be the sum of the convergences of all bit positions. If the calculations of convergence are not normalized, then the longer the chromosome, the larger the possible value for the population convergence and hence the above definition of convergence. Thus the unnormalized definition of convergence allows comparing different solutions achieved based on different chromosome lengths. Normalized convergences are also provided by dividing the unnormalized ones by the number of loci bits comprising that particular convergence. The normalized convergences are then independent of the lengths of the genes or chromosomes.

The convergence measurement attempts to quantify the hyperplane information present in the population for each gene. The more random the values of a given gene across the population, the less information the population contains concerning the optimum value for that parameter, and our convergence measurements are correspondingly higher. Under these circumstances the higher convergence triggers the decrease resolution operator which results in a chunking of the finer, but randomly sampled, mesh into a coarser mesh allowing the algorithm to discover at the coarser mesh the best value. Once the population begins to collapse upon this best value the convergence declines which ultimately triggers the increase resolution operator reinstating a finer mesh, but now the population and adaptive translation mapping have evolved so that the algorithm is now capable of searching at the finer mesh.

THE HAMMING CLIFF PROBLEM

Figure 16:
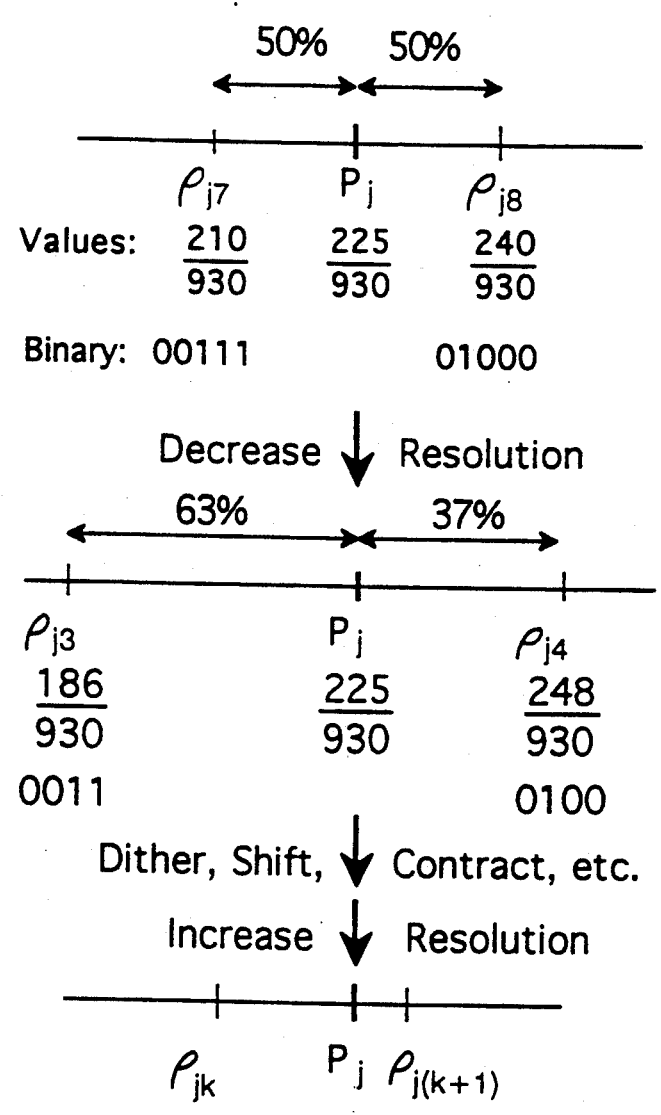
FIG. 16 is an illustration of avoiding the Hamming cliff problem.

Referring to FIG. 16, in a typical Hamming cliff situation, suppose $p*=p_j=225/930$ is the optimal value of the parameter, and the chromosome resolution and roving boundary placement are such that the two nearest trial solutions $p_{j7}$ and $P_{j8}$ are equally distant from $p_j$ and are represented respectively by chromosomes having values 00111 and 01000 (i.e., separated by a relatively large Hamming distance) corresponding to trial solutions of 210/930 and 240/930. Suppose ARGOT has converged on these two values with half of the chromosomes being 00111 and the other half 01000. The convergence measurement will be high, triggering the decrease resolution operator. As seen in the middle of FIG. 16, the lower-order bit of each chromosome is dropped so that the corresponding trial solutions become 186/930 and 248/930 which conveniently are no longer equally distant from $p_j$. By now applying the other ARGOT operators (e.g., dither, shift, contract) to adjust the roving boundaries and followed by increase resolution, ARGOT is able to reach trial solutions $p_{jk}$ and $p_{j(k+1)}$, nearer to $p_j$.

Another possible measurement of convergence, or nonuniformity, is entropy. Entropy, as defined in a statistical mechanics sense (that is, considering each trial parameter as representing a point in a phase space), is not a useful measure of convergence of a specific gene for the function optimization problem because each gene will almost certainly have the maximum entropy possible since it is likely that each phase space cell contains at most one point. Instead, ARGOT uses a "vertical", as opposed to the "horizontal" entropy, convergence measurement of the bit-wise nonuniformity across the population for each parameter. Since each bit only has two possible states and there are N (=200) chromosomes, there is a statistically reasonable sampling and thus the vertical convergence is a good measure of the nonuniformity for each bit.

One potential problem with vertical convergence is caused by the coding approach used in the representation scheme. In binary coding, for example, adjacent parameter values sometimes correspond to genes that differ in most of their bits, a problem that can be circumvented by the resolution operators. As we have seen in our experiments with the ARGOT program, reflected Gray coding eliminates this, so-called Hamming cliff, problem for adjacent trial parameters at the cost of decreasing the efficiency of crossover and the SGAO's ability to search the hyperplanes, but again the ARGOT resolution operators circumvent these inefficiency problems. Within the ARGOT system either a binary or a Gray coding scheme may be employed for representing the parameters, either globally or on a parameter-by-parameter basis. In addition, there are global switches, which do not depend upon the chromosome switches, for the coding scheme to be employed in the convergence measurements. Thus, the convergence measurements may be performed in one coding scheme, say Gray, while the SGAO may be applied in a separate coding scheme, say binary. Each gene also has two local switches that determine which coding scheme will be used for any GA operators applied to it as well as its convergence measurements, enabling the user to test the efficiency of the ARGOT operators in either coding scheme.

As we have seen, each gene has associated with it two thresholds (280, FIG. 10), an upper threshold (78, FIG. 13) which, when surpassed, triggers the decrease resolution operator, and a lower threshold (76, FIG. 13) which, when surpassed, triggers the increase resolution operator. In the intermediate regime between the two thresholds, the dither operator is triggered.

Figure 14:
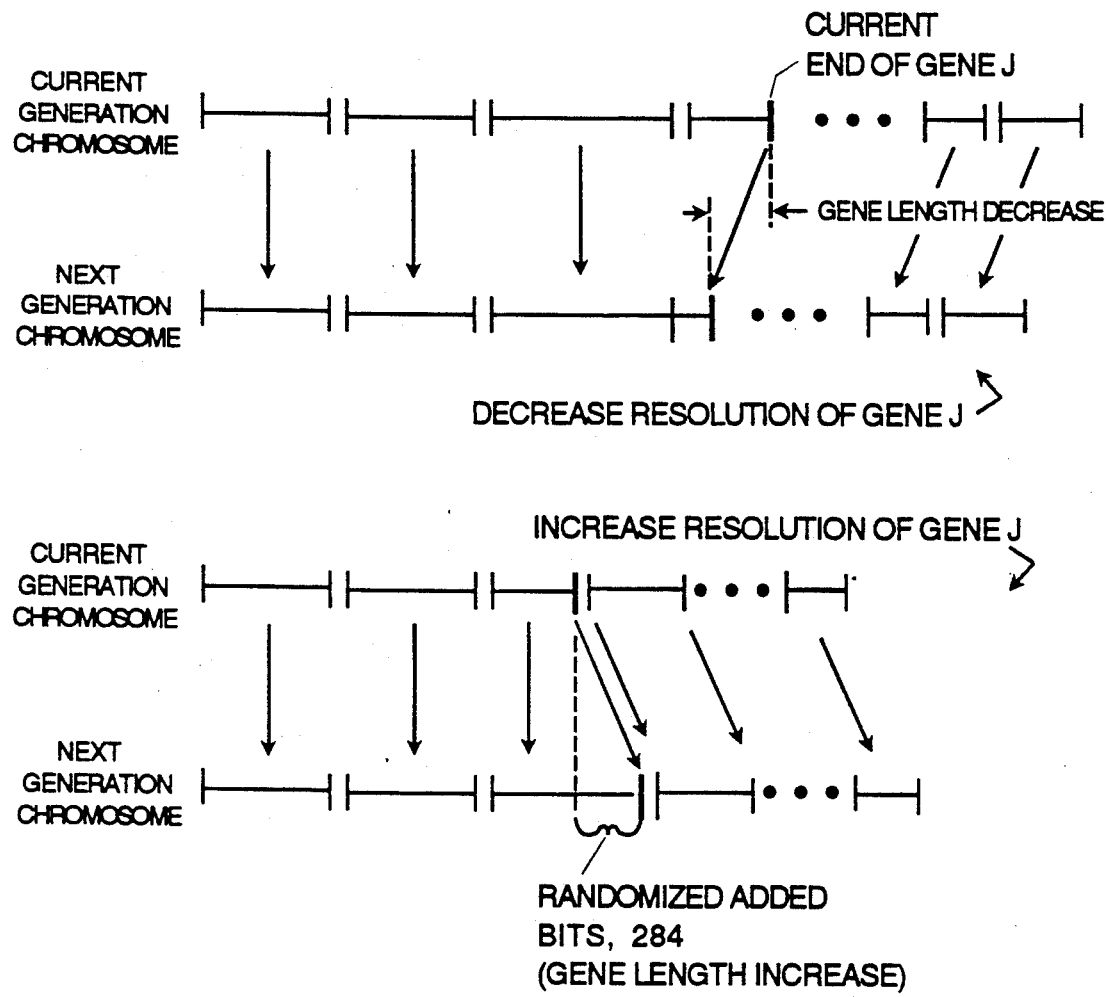
FIG. 14 is a diagram of the operation of the decrease resolution and increase resolution operators.

Referring to FIG. 14, in the binary code representation, the increase resolution operator simply adds additional bits 284 to the current parameter representation in the least significant bit positions. These added bit positions are then given random values across the population. The decrease resolution operator deletes the least significant bits in the representation of a parameter.

The dither operator arbitrarily and separately shifts the upper and lower roving boundaries of a parameter.

A potential problem with vertical convergence measurements concerns multimodal parameters. If a parameter is truly multimodal, then ARGOT (without the $Mod_s$ operator switched on) will initially cause the population of chromosomes to converge towards a multimodal distribution of trials. This distribution will typically have a large vertical convergence, even though the population has undergone some convergence and is far from representing a uniform distribution of trial solutions. Thus ARGOT maintains large roving boundaries for multimodal parameters for many generations into the optimization. In fact, a multimodal parameter will have a large domain (range spanned by the roving boundaries) even after other unimodal parameters have contracted their domains. After the unimodal parameters have contracted, and typically late in the optimization, ARGOT ultimately chooses one of the peaks of the multimodal trial distribution by contracting its boundaries; the chosen peak almost always corresponds to the global solution. Hence the ARGOT algorithm does not typically converge to local solutions.

If the multimodality measure ($[M_{mod}]$) along with the Splitting and Joining operators ($Mod_s$ and $Mod_j$) are being employed, then ARGOT will separately pursue the various potential optima (via speciation) yielding results that give all of the degenerate global solutions as well as providing a few of the local optima as well. Providing multiple solutions by this means can be very beneficial for certain types of optimization problems. (These measures and operators are discussed below in the section "Fourth Moment Measurement and Split and Recombine.")

TRIAL SOLUTIONS POPULATION STATISTICS AND RELATED OPERATORS

There are three trial solutions population statistical measurements: first moment (position) 302, second moment (variance) 304, and fourth moment (multimodality) 306.

POSITION (FIRST MOMENT)

The position measurement finds where the current average estimate of a parameter's value is located relative to its roving boundaries. For this purpose, ARGOT calculates the first moment of the trial parameters and normalizes it as a fractional value of the current parameter domain size; this positioning measurement (281, FIG. 11) thus ranges from 0 to 1. Each gene has two thresholds (called left/right thresholds 288, FIG. 10) associated with it. The lower threshold, when surpassed by the positioning measurement, triggers the shift left operator 308, which moves (FIG. 7) both the upper and lower roving boundaries by an equivalent amount to the left. A shift factor (290, FIG. 10) associated with each gene determines the distance that the roving boundaries will be shifted. Each gene's factor is multiplied by the current domain size to yield the shift value. Similarly, when the upper position threshold is surpassed, both roving boundaries are shifted to the right by an amount controlled by the shift factor and the current domain size. Below we provide a detailed account of these operations.

Figure 15:
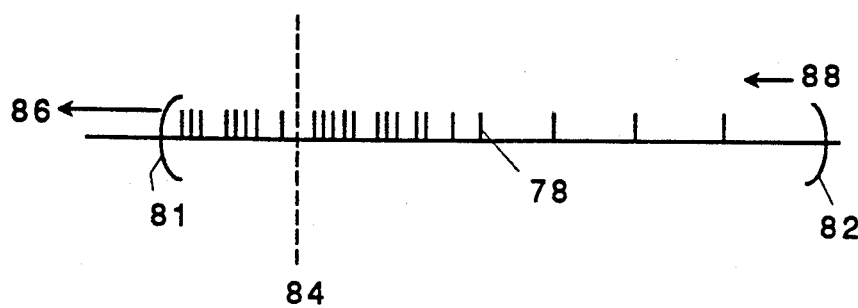
FIG. 15 is a diagram illustrating the position measurements.

As mentioned, the position measurement gauges the first moment (i.e., average value) of the trial solution parameter values relative to the current roving domains, corresponding to the values of the genes presently represented in the chromosome population. Referring to FIG. 15, these values 78, for example, may be bunched at one end of the range between the base 81 and the cap 82 with the first moment measurement at 84, suggesting that it would be desirable to shift both base and cap 80, 82 to the left as suggested by arrows 86, 88.

The shift left operator 308 is triggered only if position measurement 84 is below the minimum threshold and the amount of the shifting is a corresponding fraction of the current domain, cap-base. Shifts to the right are made in a similar manner by the shift right operator 310. Both shift left and shift right are roving boundary operators 312 (FIG. 8).

VARIANCE (SECOND MOMENT)

The third type of population measurement, the variance measurement 304, estimates the breadth of the trial parameter distribution, relative to the current parameter domain, based on the second moment of the trial values. Other measures of kurtosis, such as the percentile coefficient, may alternatively be used. If the trial parameters are roughly uniformly distributed across the parameter domain, i.e, the distribution is platykurtic, then the domain is expanded in size. The amount of expansion is determined by an expansion factor (292, FIG. 10) multiplied by the current domain size. Similarly, if the trial parameter distribution is leptokurtic, or sharply peaked, relative to the parameter domain, then the roving domain is contracted in size by an amount determined by a contraction factor multiplied by the current domain size. The actual variance measurement is simply a calculated $\sigma^2$ for the trial parameters divided by the current domain size. Again, upper and lower thresholds 294 for each gene determine whether the expansion or contraction operators are triggered.

For multimodal distributions the variance will be large resulting in expansion of the roving domain to include all of the peaks in the trial parameter distribution. In this way, ARGOT continuously samples all solutions, including local and global, to find the optimal global solution. When the global solution is degenerate (a parameter has two optimal values leading to the same global optimal payoff) ARGOT (without the $Mod_s$ operator switched on) oscillates between the two global solutions in early generations but ultimately settles into one of the global solutions and contracts its roving boundaries to eliminate the other global solution. This contraction occurs late in the optimization and thus the information provided by ARGOT on the oscillatory behavior during the optimization run is a good indication that the distribution of a particular parameter is multimodal.

Also optionally associated with each gene in connection with the expansion/contraction operators is a value representing a minimum span below which the roving parameter domain will not be contracted. Thus each gene has its own minimum domain size. Below we describe in greater detail these operations.

The variance measurement 304 determines a normalized second moment of the present trial solution values, and accordingly triggers the expansion operator 314 (if the variance is above a maximum threshold 316), the contraction operator 318 (if the variance is below a minimum threshold 320), or optionally at a very low probability (typically zero), the homotopy optimizer operator 322 and the annealing raise or lower operators 324 (if below the minimum threshold), or, if in between thresholds, no operator is triggered.

Returning to FIG. 7, the contraction operator 318 moves the base to the right and the cap to the left and may decrease the resolution to maintain approximately the same increments so that the coverage remains similar. Conversely, the expansion operator moves the base to the left and the cap to the right and increases the resolution.

As explained below, the homotopy optimizer moves from a current trial solution to a better trial solution based on the apparent slope of the function in the vicinity of the best present trial solution. In that case, the corresponding chromosome must be changed to reflect the new trial solution value.

A number of other operators 330, FIG. 8, are also provided, as explained below.

ELITISM

The SGAO uses a standard elitist operator 301 (FIG. 9) which remembers the current best chromosome and prevents this remembered chromosome from being altered by crossover or mutation. If the best chromosome in the current population has a better payoff than the remembered best chromosome, a copy of the best chromosome is added to the current population. ARGOT also uses this elitist strategy, but the nature of ARGOT demands more complex elitist operators.

One ARGOT elitist operator, roving elitist 332, assures that the other ARGOT operators do not cause the mapping 44 to forget the current best trial parameter when those other operators are applied. Each gene has a flag, or switch, which determines whether the roving elitist operator will be applied to it.

For example, assume that for a specific parameter the current resolution is 5 bits and the seventh trial solution in the trial population is the current best estimated value. If the convergence of this parameter is below the parameter's threshold, then the increase resolution operator will be triggered which increases the resolution from 5 to 6 bits. As a consequence, the roving domain will be divided into 63 parts instead of 31 parts and none of the new trial parameters will be located at exactly the position of the old best trial value. If this parameter's flag for the roving elitist operator has been switched on, then the roving boundaries are shifted by the smallest amount possible to bring one of the new potential trial parameters into coincidence with the old best trial value.

The second elitist operator, ultra elitist 334, is similar to the standard elitism of SGAO, but allows the current chromosome population to forget the best estimates for a few generations before reintroduction. The current working set of chromosomes may thus climb uphill at times (reminiscent of global homotopies).

A first component of ultra elitism operates by defining two sets of best parameters. The first set, called the ultra parameters, are the parameter values for the chromosome having the best payoff 336 (FIG. 12) obtained during the entire optimization. The second set, called the best parameters, are parameter values associated with the chromosome having the best payoff 338 during a period of time shorter than the entire optimization. That is, the best parameters are updated periodically instead of being remembered for the entire optimization. [In the standard elitist operation, every generation the working population's best chromosome is compared against the best parameters and a new best chromsome is reintroduced if it has been lost. This does not allow the population to forget the best chromosome and thus eliminates the ability of the population to move "uphill" at times when appropriate.]

Initially, the ultra and best parameters are identical, but after a specified number of generations, the best parameters are reset to the current best trial parameters in the working population. This means that the best parameters may entail a worse payoff than the ultra parameters and thus might appear to lead to a worsening ARGOT behavior. But ultra elitism allows ARGOT to sample more carefully the regions near local optima to determine whether they lead to global optima.

For example, if, by chance, the ultra parameters have found a local optimum with a relatively good payoff compared to the average population payoff, standard elitism would continuously copy the ultra chromosome into the working population, often leading to premature convergence of the population to the ultra parameters.

Ultra elitism, by contrast, allows the working population to forget the ultra parameters through chromosome deletion, crossover, or mutation and to introduce new best parameters, which are actually in some sense worse than the ultra parameters, to help keep the working population from converging prematurely onto the ultra parameters. This allows ARGOT to more effectively search a greater proportion of the parameter space.

A second component of ultra elitism involves periodically injecting a new chromosome whose parameter values are those of the ultra parameters. This is a hedge against the possibility that the first found ultra parameters are close to the true global solution; in other words, the working population is reminded of the current ultra payoff and parameters.

MUTATION

The usual mutation operator 323 of SGAO reduces the chance of losing alleles (specific bit values at a particular bit position along the chromosome) from the chromosome population. Random deletion, crossover, or mutation of chromosomes may eliminate a particular allele. Note that the crossover operator is incapable of reintroducing a lost allele. Therefore, in the SGAO, the mutation operator may reintroduce (randomly and at some low frequency) possibly lost alleles by switching the current allele at a locus for a chromosome in the population. The probability of mutation of any particular locus is set so that after a few generations, on average, each locus has undergone a single mutation within the population. For example, for a population of 100 chromosomes, a typical mutation probability is in the range 0.0005-0.001.

Because mutation disrupts schema which are being searched and evaluated by crossover and selection over the population, the mutation probability must remain low for crossover to be effective in searching the space of hyperplanes. For instance, a mutation probability of 0.01 is normally too large for most problems and leads to failure of a SGAO.

Much higher mutation probabilities (e.g., in the range from 0.0005 to 0.05) are possible within ARGOT because it adapts its representation for each of the trial parameters. ARGOT not only finds global solutions over this range of mutation probabilities, but even improves its performance at the higher mutation rates. In effect, ARGOT uses mutation not only as insurance against loss of alleles (as in the SGAO) but also as a method of searching the current chromosome space. In essence, higher mutation rates simply generate more random trial solutions; this becomes a viable search strategy because, early on, ARGOT decreases the resolution at which each of the parameters are being searched and thus the space of trial solutions is not very large compared with the potential trial solution space at large resolutions. Moreover, the higher mutation rates may now effectively sample the smaller ARGOT solution space. Crossover within ARGOT's smaller search space is still significantly more effective than crossover within the full search space of SGAO. Said another way, the order of the hyperplanes within ARGOT is kept much smaller than within SGAO so that each hyperplane has more significance within ARGOT. Since the required hyperplanes are of lower order for ARGOT, ARGOT can withstand much larger mutation rates than the SGAO before mutation begins to decrease the effectiveness of crossover.

METROPOLIS MUTATION OPERATOR

Referring to FIG. 10, to take advantage of the fact that ARGOT performs better using larger mutation probabilities, one might consider a mutation operator which biases its choice of mutations instead of being entirely random. One bias procedure would be only to accept a mutation at a particular locus if the payoff to the mutated chromosome decreases. Such a mutation operator is suggestive of local homotopy methods upon which the "downhill" constraint is imposed, and in the same way could cause the SGAO to become stuck in local minima.

In analogy to the work of Metropolis and co-workers, we have introduced a biasing scheme for ARGOT that accepts chromosome mutations that represent not only downhill movements but also uphill movements, with the acceptance rate weighted according to the exponential of the size of the uphill movement, i.e., the farther uphill a mutation would take a chromosome, the lower the probability the mutated chromosome has of being accepted. The weighting function provides, in essence, a Boltzmann distribution of accepted trials and therefore has a temperature associated with this weighting distribution. If one takes this temperature to be infinite, all mutations are accepted no matter what their payoffs to the chromosomes. This is equivalent to the SGAO's standard mutation operator. For a temperature of zero, only mutations for which the payoff decreases are accepted. This is equivalent to the aforementioned downhill mutation operator. Finite, nonzero, temperatures allow mutation to proceed uphill at times and thus has some of the properties associated with global homotopy techniques.

SIMULATED ANNEALING OPERATORS

In simulated annealing techniques, trial solutions are accepted based upon the Boltzmann weighted probabilities. As a solution proceeds, the temperature is decreased from some arbitrary, high value which initially accepts all trials down to a minimum temperature (typically zero) at which one accepts only trials which yield decreasing payoffs. The process of decreasing the temperature during the solution is called an annealing schedule. It is well known that devising an annealing scheule is difficult and depends highly on the specific problem. It is conventional practice that either the temperature is decreased exponentially at given equal time intervals or manual intervention is employed to change the temperature when the algorithm appears to be stalled or in equilibrium. Exponentially declining temperatures is by no means an optimal annealing schedule but is employed because it is relatively easy to implement. The ARGOT System, on the other hand, is able to generate an automated annealing schedule based upon statistical measurement over the population of chromosomes; this population amounts to a population of simultaneously running simulated annealing algorithms. Below we provide a detailed explanation of these operations.

ARGOT uses a metropolis mutation operator 340 and two annealing schedule operators 324 to control the temperature for the metropolis mutation. The annealing schedule operators are triggered by population measurements such as convergence 264 or variance 304. The underlying strategy is that, if the population convergence or variance is large, then the trial solutions are not well-known, ARGOT is still attempting to search the entire solution space, and thus most of the mutations should be accepted. In this case the present temperature is multiplied by a factor 341 greater than unity leading to a larger proportion of accepted mutations. If, on the other hand, the population convergence or variance is small, the strategy assumes that the trial parameters are better known and that too much mutation would disrupt the information gained by the chromosome population. Then the annealing schedule lower operator is triggered to multiply the current temperature by a factor 343 less than unity leading to a fewer number of accepted mutations. In effect, the metropolis and annealing schedule operators run a large number, e.g. 200, of simulated annealing problems, measuring statistics on the behaviors of those trials, and using the statistics to determine whether or not the temperature should be decreased or raised. Therefore, manual intervention becomes unnecesssary for an intelligent and appropriate control of the annealing schedule.

HOMOTOPY OPTIMIZATION OPERATORS

ARGOT, even without the homotopy operators, will determine the parameter values to any desired numerical precision by contracting the roving domains and increasing the resolution. Thus, while the homotopy optimizer operator 332 is not necessary for ARGOT to converge efficiently, it may, however, speed the later stages of function optimization problems. As previously mentioned, given the shortcomings of local homotopy methods, a composite strategy is sometimes suggested which would apply SGAO early in the optimization and then later switch to a homotopy method. The difficulty with this composite strategy is in knowing when to make the switch without knowing the solution in advance. A premature switch may cause the homotopy method to become stuck in a local optimum or diverge. If the switch is made too late, the efficiency advantages of homotopy methods are lost.

ARGOT's homotopy optimizer operator is based on internal measurements on the population of chromosomes, a scheme that enables a reasonable strategy for when to make the switch. In particular, each parameter has an associated flag which determines the type of internal measurement to be used and a threshold value 345 that, when surpassed, triggers a homotopy operator. Both convergence and variance have been used as the measurements. Heuristic arguments for using these measurements are as follows.

As the convergence for a given parameter decreases below some low threshold, the chromosome population has reasonably high confidence in that parameter's value and ARGOT is likely converging to an optimal value. At this point, a homotopy optimization is applied only to the parameters whose convergences are below their thresholds. If the homotopy optimization provides parameters whose payoff is below a multiplicative factor times the current best payoff of the population, then a new chromosome is created whose parameter values consist of those returned by the homotopy optimization. If the homotopy optimization parameters lead to a significantly worse payoff, it is assumed that the homotopy technique is not converging to the solution and thus no chromosome is created with those parameter values.

Because this triggered homotopy operator is applied only to those parameters whose values the chromosome population is currently converging on, the homotopy operator will not be applied to a parameter whose current trial distribution is platykurtic, and, as a consequence, usually will not lead to a divergence in the trial solution. Experiments on nonlinear optimization problems show that the homotopy operator only leads to a better solution when the current best value is relatively near the optimal value. Thus the homotopy optimizer acts best to refine the cruder trial values already found by ARGOT. If the homotopy optimizer is invoked often, through large thresholds, it seldom leads to better parameters and is consequently wasting computation time. Near the end of an optimization, however, the homotopy optimizer in conjunction with the other ARGOT operators refines the solution faster than ARGOT alone. But it should be stressed that the homotopy operator is completely unnecessary for the efficient operation of ARGOT and consequently is not often employed on complex problems since it tends to waste computation time.

FOURTH MOMENT MEASUREMENT AND THE SPLIT AND JOIN OPERATORS

The [$M_{mod}$] population measurements 306, while not necessary for many types of optimization problems, are important for certain optimizations where multiple solutions are possible. As previously noted, ARGOT (without these fourth moment measurements and their triggered operators) will often "jump" between global solutions before eventually settling upon one of them. This behavior is a good indication that multiple solutions exist; and when it occurs, the trial solutions as well as their corresponding chromosomes are found to cluster around the different global optima. The multimodality measurements, [$M_{mod}$], attempt to quantify these clusterings by measuring the fourth moments of the trials over the solution or chromosome spaces. If the measurements surpass a maximum threshold value 350, the chromosome population is split into subsets, called species, and the crossover operator is biased towards choosing parents from the same species for mating.

The operator that accomplishes this task is called the splitting operator 352, $Mod_S$; it labels the chromosomes according to their species and handles the splitting of the roving domains into species specific domains (each species has its own roving boundaries and gene representations). This speciation, of course, makes the ARGOT translation mapping more complicated. On the other hand, if the multimodality measurements fall below a minimum threshold, then another operator, the joining operator 356. $Mod_J$, is triggered that carries out all of the necessary tasks to recombine two species of chromosomes into a single species. If the thresholds are not surpassed by these measures, then neither $Mod_S$ nor $Mod_J$ is triggered.

Multiple applications of the splitting and joining operators to a particular gene can create any number of subspecies and their attendant roving domains. Thus any number of optima may be accomodated with these operators. This is the reason why only the fourth moment need be measured: multiple application of these operators yield information on all other moments.

OTHER POSSIBLE MEASUREMENTS

Other solution and chromosome space population measurements would also be possible, such as additional moments or various measurements of skewness, kurtosis, and covariances between parameters, to control new triggered operators in the spirit of the ARGOT strategy. In our experience, however, the present set of ARGOT operators (FIG. 10) provide a system flexible enough to learn different strategies for function and combinatorial optimizations. Of course, classes of more complex problems may require more complicated operators to effectively adapt the representation dynamically to the problem.

USER CONTROL

To enable ARGOT to function not only as a powerful function optimizer but also as a research tool for study of machine learning within the general context of optimization problems, each feature of ARGOT may be controlled by the user via the user interface 49. The user may specify whether a particular ARGOT operator will be employed, what type of internal population measurement will trigger the operator, and the "size" of the specified operation. The user interface also allows different operators, and their size parameters, to be specified for different genes using flags associated with the genes.

THRESHOLDS

As already indicated for many of the operators, also associated with each ARGOT operator (and specified by the user) are global minimum and maximum thresholds which determine whether a specific ARGOT operator will be triggered. If a particular measurement over the entire chromosome population surpasses one of its global thresholds, then the corresponding ARGOT operator will be applied to each gene; otherwise, the ARGOT operator is not used in this generation. Nevertheless, even if a particular operator flag has been "switched on", and its global threshold criterion has been satisfied by the population measurement, the corresponding ARGOT operator may not be applied to any particular gene. Each gene has an associated set of local flags and thresholds which must also be satisfied, once the global threshold test has been passed. Only if an internal measurement over the population for a specific gene satisfies that gene's local threshold condition will the ARGOT operator be applied to that gene. Furthermore, each ARGOT operator may be switched off for only certain genes and switched on for others. By contrast, SGAO's crossover and mutation are applied uniformly to the entire chromosome. Thus, ARGOT is able dynamically to adapt its strategy to the nature of the problem as the solution proceeds by considering and adapting to each parameter individually.

When all of the ARGOT operators are switched off, ARGOT operates the same as SGAO.

SAMPLE PROBLEM PARAMETERS

The typical values, as well as the domains investigated, of the various genetic and ARGOT operator parameters are summarized in FIGS. 17, 18, where the 'Domain' column indicates the ranges of the various parameter values that have been tried, and the 'Typical' column values are the ones used to yield the TSP results discussed below. A 'Typical' generation parameter of zero indicates that the associated operators were not employed, e.g., $H_{t}=0$ means that the Homotopy operators were not used for the TSP results. (ARGOT works well, besides being faster, without the homotopy, metropolis, and annealing operators.) Whenever two values are given as Typical, the first refers to the VAX implementation and the second to the Connection Machine implementation (mentioned below).

EXAMPLE OF THE TRAVELING SALESMAN PROBLEM

Figure 20:
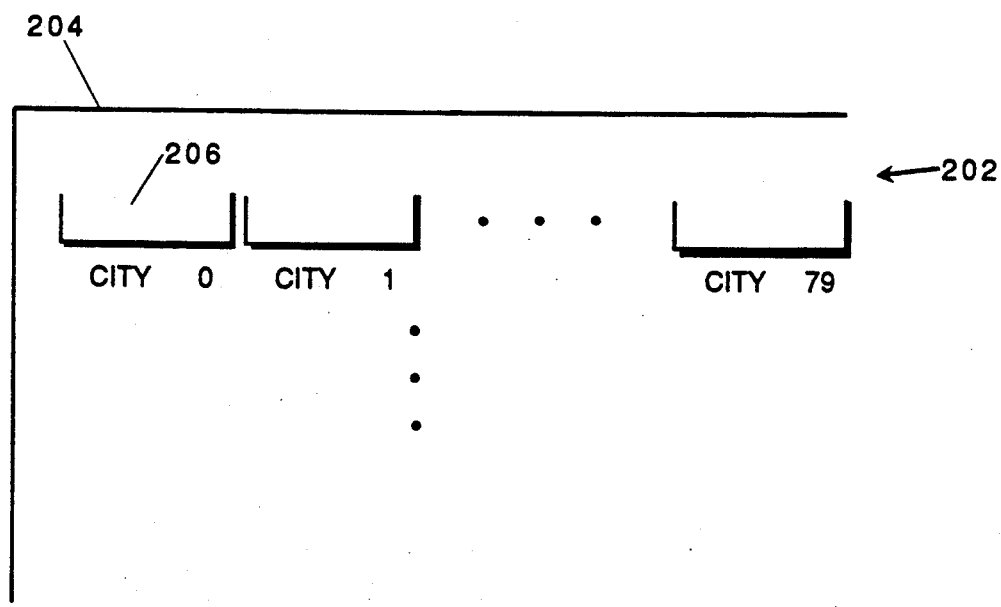
FIG. 20 is a diagram of a representation chromosomes in a traveling salesman problem.
Figure 21:
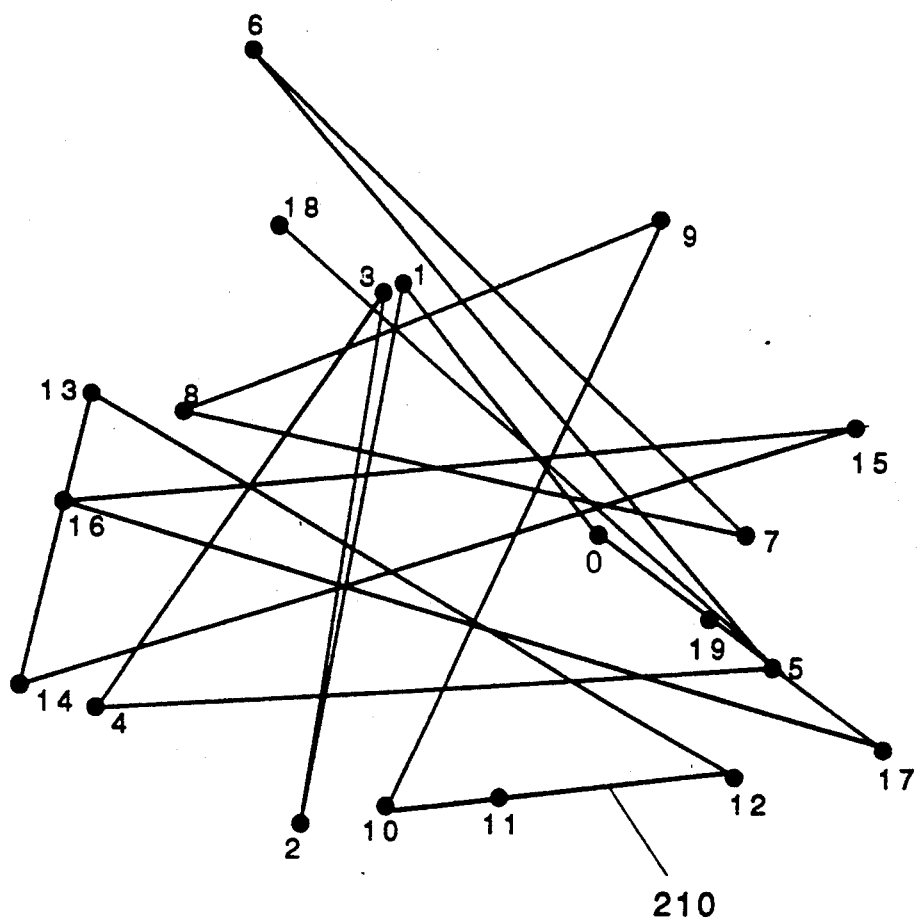
FIG. 21 is a map of a random tour.

Referring to FIG. 19, ARGOT was applied to execution of a 20-city TSP with the 20 cities located as shown. FIG. 21 shows a tour that is a typical randomly chosen route. Referring to FIG. 20, to represent a tour as a chromosome 202 we choose the following scheme: each city, labeled 0-19, is assigned a single parameter, $P_i$, i=0, ..., 19, which is allowed to vary over some predetermined domain. A chromosome then is comprised of a bit string of the 20 binary numbers 206 representing $P_0$-$P_{19}$. To interpret a particular chromosome as a trial tour, the chromosome parameter values, $P_0$, ..., $P_{19}$, are sorted in decreasing order with the resulting order giving the tour. In other words, say the parameters are sorted to give the following order: $P_{17}$, $P_2$, $P_{18}$, ..., $P_7$; then the corresponding trial tour is 17, 2, 18, ..., 7, which means: start at city 17, proceed to city 2, and so forth until city 7 is reached at which point return to city 17 thereby completing the tour. Although there are other possible tour representations, this one suits our needs for distinguishing ARGOT and illustrating its behaviors.

With this scheme, let us discuss how a SGAO behaves. First, it is reasonable to have all of the parameter domains identical so that no single parameter value is a priori biased towards the top of the sorted order and the front of the corresponding tour. Next we must choose the number of bits per parameter on the chromosome. Obviously 3 bits would be too few since then there would only be $2^3=8$ discrete parameter values for the 20 cities and therefore duplicate values would be certain (duplicate values, say $P_8=P_{13}$, are interpreted to mean that when cities 8 and 13 are arrived at in the developing route, either one is chosen at random to be first with the other following, before continuing with the tour). A large number of these duplicates, which 3 bits would require, means that the resulting tour would be largely random, look similar to FIG. 21, and consequently not be a very short route.

At the opposite extreme, consider 20 bits per parameter. Now there are over one million possible values per parameter and with only 20 cities it is unlikely for duplicates to occur. But now a new problem arises—20 values spread over the $2^{20}$ possibilities is so sparse that mutation and crossover of the chromosomes is not very likely to change the parameter ordering. In other words, given a particular parameter value, all of the nearby possible values typically will not produce different tours. Hence mutation and crossover of the chromosomes becomes ineffective at searching the trial solution space. There may be some optimal bit length between 3 and 20, but without analysis it is unknown.

ARGOT, on the other hand, dynamically alters the number of bits allocated to each city; at times a particular city may require more bits to better locate its proper ordering while at other times only a few bits are needed.

Figure 22:
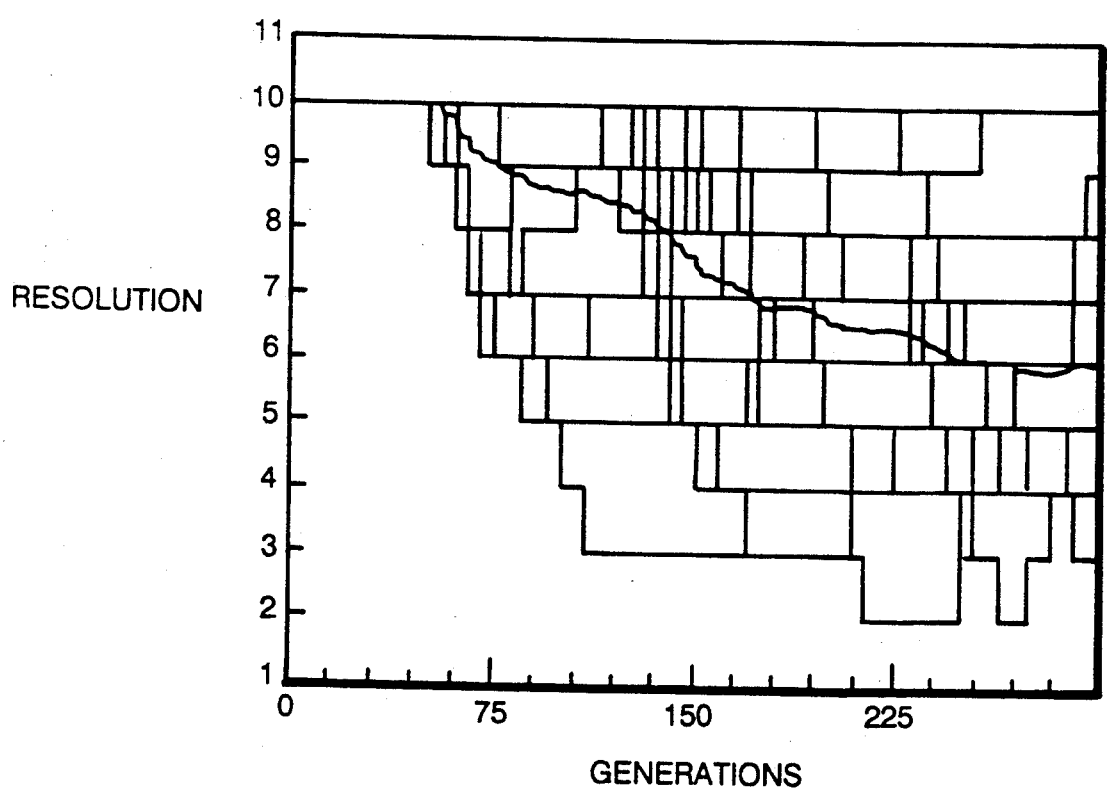
FIG. 22 is a chart of resolution values for the cities of FIG. 19.

FIG. 22 graphs the resolutions, or numbers of bits, for all 20 cities as a function of the generation count. Note the dynamic adjustment of resolution. The crooked line is the average number of bits per city. ARGOT may be started with any arbitrary number of bits per city: too many, say 10 bits, as illustrated in FIG. 22; or too few, say 2 bits. The user does not need to analyze the probelm in order to determine the optimum resolution since ARGOT will adjust the initially chosen resolutions dynamically to suit the current status of the optimization procedure.

Figure 23:
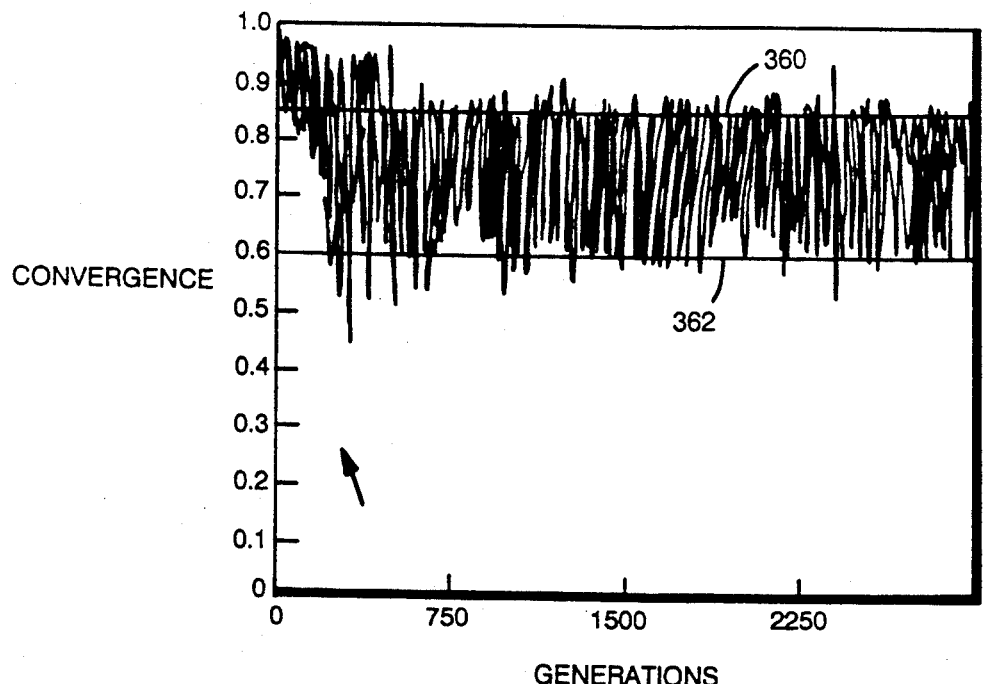
FIG. 23 is a chart of convergence for the traveling salesman problem during an ARGOT solution.
Figure 24:
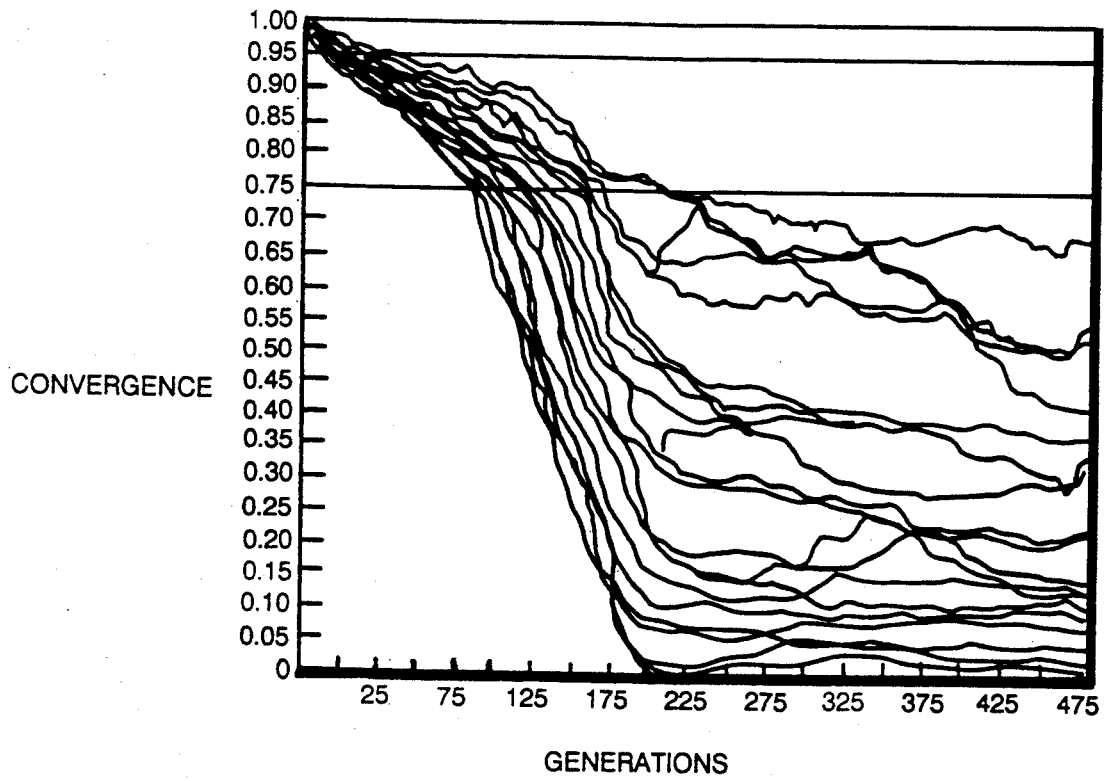
FIG. 24 is a chart of convergence values during an SGAO solution.

These resolution adjustments, made via the $R_I$ and $R_D$ operators of FIG. 10 are pictured in FIG. 22 and are controlled by the convergence measurements, $<\epsilon_i>$, over the chromosomal population. FIG. 23 illustrates that the $<\epsilon_i>$ are maintained within their thresholds 360, 362 by these operators. FIG. 24 shows what happens when these operators are turned off (resolutions are 10 bits); many of the convergences precipitously plummet to near zero—indicative of premature convergence problems for the SGAO.

Instead of fixed domains, ARGOT employs roving boundaries along with their contingent of operators: D, $S_L$, $S_R$, $V_E$, $V_C$, and ER (see FIG. 10). In order best to distinguish ARGOT from other methods, choose the 20 parameter domains to all be non-intersecting, i.e., the domain of values for any specific parameter does not overlap any other domain. This is a particularly poor representation.

In particular, choose the 20 parameter domains to be only 0.01 in size and equally spaced in the range 0.25 to 0.75: $P_0=(0.25, 0.26), \ldots, P_{19}=(0.74, 0.75)$. In this case all possible chromosomes will be interpreted to give one tour, $0,1,\ldots, 19$, and because the labels were originally randomly chosen, this tour is random and suboptimal. Note that, given this representation, there is nothing that the SGAO, Monte Carlo, homotopy, or simulated annealing methods can do to find a better tour—all four algorithms can only yield the $0,1,\ldots, 19$ tour and consequently fail with this representation. This representation is chosen for precisely this reason; it demonstrates that a poor representation may lead to failure of a particular algorithm while the ARGOT strategy alleviates this problem by adjusting its mapping so the problem can be solved. For most real problems the best possible representation is typically unknown and thus the choice is somewhat arbitrary which may lead to failure of the search algorithm.

Figure 25:
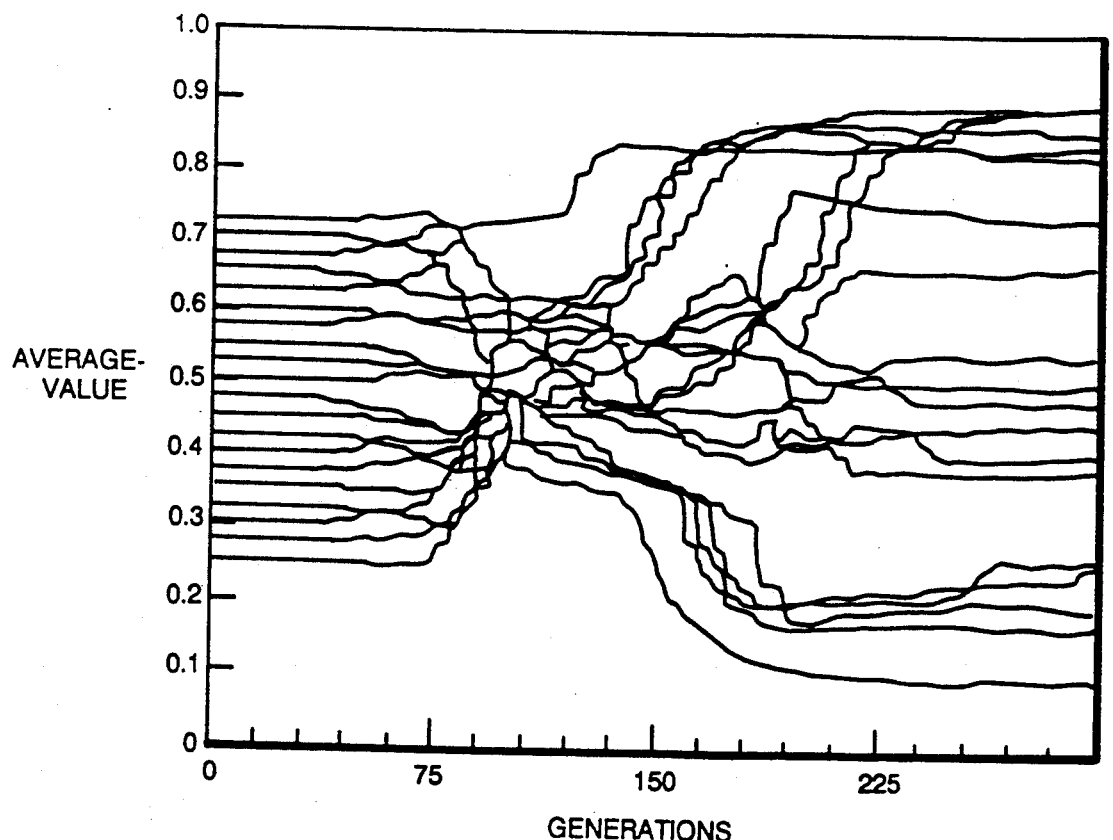
FIG. 25 is a chart of average values for the cities of FIG. 19 during an ARGOT solution.
Figure 26:
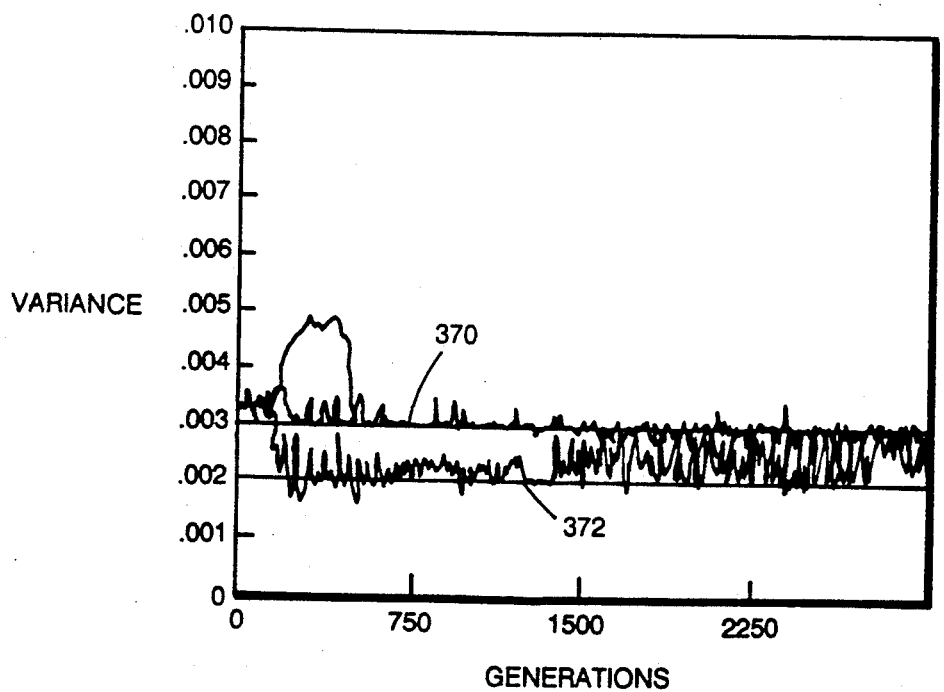
FIG. 26 is a chart of variance values during an ARGOT solution.

The average values of each parameter over all of the trial solutions is plotted in FIG. 25. The equal spacing of the averages at generation 0 is indicative of the non-intersecting parameter domains. Only ARGOT is capable of adapting the roving boundaries to allow the domains to interact. Note that the averages begin to intersect around generation 50 as the domains are expanded by the $V_E$ operator. Also notice how the averages form clusters, say at generation 200. These clusters form as ARGOT learns which cities are near to one another and thus need to have their ordering permuted to search for their optimal local tour, and which other cities are distant and hence should not have their ordering permuted, so they end up in different clusters. The $V_E$ and $V_C$ operators are controlled by the variance measurements graphed in FIG. 26. Again these operators keep the population variances within their threshold boundaries 370, 372 while for the SGAO the variance quickly decline to values near 0 because of chromosomal convergence.

FIG. 27 shows details of the roving boundaries for cities 15 and 16. These graphs consist of four plots, the two outer curves (lower and upper curves) are the roving boundaries (base and cap) while the inner curves are the current best value along wth the average value over the population. Note that because of their arbitrary labeling and consequent nearby domains, cities 15 and 16 quickly start to interact. After interacting for a few generations, ARGOT "learns" that these cities are distant and do not need to interact; the shift operators propel their roving boundaries past one another so that by generation 225 their domains are no longer interacting and hence their relative tour ordering cannot change.

FIG. 28 illustrates a brief analysis of the strategy developed by ARGOT for city 16. Initially, at generation $t_1$, city 16 is isolated. Because of the arbitrary ordering, city 16 soon interacts with cities 15 and 17 which turn out to be distant. By generation $t_2$ ARGOT has removed five cities from its interaction neighborhood while the remaining cities enclosed by the loop labelled $t_2$ may all may be permuted with 16. At an even later time, $t_3$, city 16 has located its ordering relative to the majority of cities and thus its interaction neighborhood is very small as city 16 attempts to perform a local neighborhood optimization of its tour. After city 16 has discovered its best local placement, then at a later generation, $t_4$, its neighborhood is once again expanded to assure that no further optimizations are possible and that the global solution has been located. FIG. 29 plots this global optimum tour found by ARGOT.

Even though this problem is relatively simple, it demonstrates the need for and advantages of the ARGOT strategy over algorithms that do not adapt their representations. It also provides an indication that the ability to develop its own representation allows ARGOT to discover its own path, or method, to the solution. In function optimization problems, this discovery process yields results that behave in a fashion similar to those produced by global homotopy methods, but without some of their disadvantages. One might say that ARGOT has discovered its own homotopy-like procedure without homotopies being directly programmed into the algorithm (i.e., $H_t=0$).

By reviewing charts of convergence values, positioning values, variance values, resolution values, average values, best payoffs, and roving boundaries at successive generations, one can see how ARGOT develops a strategy for solving the problem, even when the initial representational scheme would otherwise be insolvable by a SGAO, a homotopy method, a Monte Carlo sampling, or a simulated annealing technique.

EXAMPLE OF A FUNCTION OPTIMIZATION PROBLEM

FIGS. 30, 31, 32 illustrate, for a function optimization problem, how ARGOT adapts the internal representation of two parameters. This problem is a 4-dimensional (4-D) nonlinear optimization problem. The graphs represent a 2-dimensional slice of the 4-D solution space. FIG. 30 shows contours (much like a topographic map) of the functional values of a 2-D slice of parameters $P_1$ and $P_2$. The solid contour lines represent valleys and the dotted contour lines represent peaks. The desired global solution is labeled "A". The small diamonds of FIG. 30 show the locations of a uniform 4-by-4 grid of initial trial solutions; that is, the population of chromosomes are all mapped into one or another of the trial solutions indicated on this diagram.

Based on measurements over the chromosomes and trial solutions, the ARGOT representational scheme is adapted after several iterations to yield the new sets of possible trial solutions shown in FIG. 31. The squares and pluses are, respectively, two successive sets of ARGOT possible trial solutions. In the case of the pluses, the numbers of possible solutions has increased from 16 (in FIG. 30) to 128 (in FIG. 31) comprising 16 pluses along the $P_1$ dimension times 8 pluses along the $P_2$ direction. This has been accomplished using the increase resolution operator, $R_I$. Furthermore, notice that not all of the 2-D slice is covered with points. The roving boundaries have been contracted in the $P_2$ direction by the contraction operator, $V_c$, and shifted in both $P_1$ and $P_2$ directions by the shift operators, $S_R$ and $S_L$, in such a manner as to eliminate from consideration a portion of the possible solution space and concentrate the chromosomes in the region surrounding the deepest valley, i.e., the global solution A.

FIG. 32 shows two successive ARGOT solution spaces at a stage after the ARGOT strategy has located the deepest valley and is in the process of refining the current best trial solution. The trial solutions are concentated in the immediate neighborhood of the global optimum and note that there are now again only 4-by-4 rids of possible trial solutions. ARGOT need only search these 4-by-4 grids in order to be able to adapt the mapping to provide even better trial solutions.

Other algorithms, such as the SGAO, which have fixed grids of points would have to continuously search through their much larger space of potential trial solutions. To give a specific example, the SGAO requires a 1024-by-1024 grid in order to locate a trial solution of comparable accuracy as ARGOT's. Of course, ARGOT will continue to refine its estimated solution with further iterations, while adding points to the SGAO's grid would lead to diminishing returns because for the larger search spaces SGAO is not capable of effective searching and thus becomes stuck in one of the local optima.

IMPLEMENTATION

The ARGOT system has been implemented, in accordance with the foregoing description, on a variety of computers and in several programming languages. In particular, working implementations have been achieved in VMS Fortran on several DEC VAX computers, in Green Hills Fortran on a SUN microcomputer, in Butterfly Fortran on the BBN Advanced Computer's Butterfly Plus computer, and in PARIS (a parallel version of Lisp) on the Thinking Machines Corporation's Connection Machine computers. Interaction with the user is achieved via a keyboard, CRT, and printer. These implementations are presently being employed to solve a number of optimization problems, both function as well as combinatorial optimizations. The Traveling Salesman Problem (TSP) example discussed above has been studied on both the VAX computers as well as the Connection Machines. A number of function optimization problems, including solving linear systems of equations and a variety of nonlinear systems, have been studied on VAX computers, SUN Microcomputers, and the Butterfly computers. As explained above, hardwired implementations along the lines of FIG. 6 would also be possible.

ALGORITHM REGIMES

The table of FIG. 33 classifies optimization algorithms into several broad categories and shows, in the primary column, operators that are used to implement them within the ARGOT Framework. The operators listed in the primary column are the chief operators used by the algorithm. If an algorithm uses other operators, but at a reduced or secondary level, they appear in the secondary column. Secondary operators are typically triggered at very low frequencies, but not always. They also provide a means for structuring composite algorithms that belong to two or more of the categories and are able to benefit from advantages of the different categories.

Many algorithms for solving function optimization problems are designed to search through a discrete space of potential solutions in an attempt to locate the best of all of the trials. Examples include SGAO, Monte Carlo, and simulated annealing. Other algorithms, such as homotopy methods, do not theoretically search a discrete space, but in practice do so because of the finite numerical resolution available for digital computing. ARGOT lies somewhere in between the strict discrete search methods and the unrestricted continuous methods: although ARGOT has a population of discrete chromosomes the representational structure (adaptive translation mapping) is continuously adjustable and thus the potential trials are theoretically continuous.

Within the class of the discrete algorithms, it is relatively simple, both theoretically and experimentally, to use ARGOT to compare the performances and accuracies of different algorithmic methods. And, in particular, ARGOT provides a general framework for direct quantitative comparison of the various discrete techniques empirically. Direct comparisons of discrete methods with homotopy or curve-tracing procedures are more difficult, both theoretically and empirically, because these algorithms are not only applying search strategies based upon different information, but also the search spaces themselves are different. ARGOT, however, also includes homotopy operators, thus these methods may be compared in a quantitative fashion with the discrete algorithms. It is important to note that these comparisons are not only qualitative but also quantitative since all algorithms are now searching identical spaces. Therefore the usual problems of comparing algorithms that search different spaces do not arise within the ARGOT Framework.

The various algorithms are implemented within the ARGOT Framework through control of the various triggered operators as indicated on FIG. 33. For instance, using a single chromosome and with only the mutation operator switched on, the search method is identical to Monte Carlo sampling, one of the mutation algorithms. By switching on and off various combinations of operators, different search algorithms may be executed and compared within the ARGOT Framework. An example of a composite algorithm would be selective Monte Carlo in which a population of chromosomes, instead of just one, would be employed along with the selection operator (L) that selects the next individual (trial) for further mutation. Thus mutation is concentrated on those trials that have better payoffs. Of course, numerous other combinations of operators also yield viable search strategies. In summary, the genetic class consists of the SGAO, the mutation class contains Monte Carlo and simulated annealing, the homotopy class includes the various local and global homotopy methods such as Newton-Raphson, and the ARGOT class includes those algorithms which adapt their respresentations of the trial solutions.

Thus, referring to FIG. 34, the ARGOT supervisor, under control of the user, is able to implement a variety of algorithms, including SGAO 402, ARGOT 404, simulated annealing 406, homotopy 408, and Monte Carlo 410, as well as combination algorithms and new algorithms 412.

APPLICATIONS

The invention is applicable to an extremely wide range of practical problems. The TSP, for example, is a paradigm of a number of real world situations for which solutions achieved by ARGOT will save time and money. This include the selection of routes for packets switched over networks that include large numbers of nodes, selection of successive legs of airline routes, the control of the paths of laser cutters used to create application specific integrated circuits from generic chips by burning interconnections, detecting homologies in the human genome, and determining the best function in a class of functions for performing image compression, to name only a few.

OTHER EMBODIMENTS

Other embodiments are within the following claims.

For example, the system need not be based on the SGAO but could equally well rest on other problem-solving algorithms, e.g., homotopies. Nevertheless, SGAO does have the advantage of an inherently parallel search through the schema of the chromosome space and is therefore fast in its search of that space. In addition, genetic algorithms (as well as the ARGOT Strategy) are highly parallelizable algorithms and they can be implemented in a parallel fashion on a variety of parallel architecture computers. In particular, we have already mentioned that ARGOT has been implemented on the SIMD architecture of the Connection Machine as well as on the MIMD architecture of the Butterfly Plus computer. Besides software implementations on these general purpose, programmable, parallel computers, the ARGOT strategy could also be in specifically designed, special purpose, serial or parallel hardware.

Also, other types of tokens could be substituted for the genes or chromosomes to represent the trial solutions, and other more complex classes of translation mapping could be devised to suit particular problems, in place of the simple translation mapping of FIG. 7.

I claim:

1. A computer method for finding the best solution to a problem of the kind for which there is a space of possible solutions, comprising
    providing by computer a representational scheme for representing trial solutions as values of tokens in said solution space, said representational scheme defining characteristics of said tokens,
    using said representational scheme to represent by computer trial solutions in said solution space as values of tokens,
    maintaining said tokens in computer memory,
    computer processing said tokens iteratively to modify their values in a manner for causing the values of the tokens to converge on the best solution,
    in at least some computer processing iterations, analyzing characteristics of said tokens and/or the set of trial solutions, and
    computer modifying the representational scheme for later computer processing iterations based on the analysis of earlier iterations, and without interrupting the succession of iterations.

2. The method of claim 1 wherein
    said tokens comprise subtokens whose values represent trial values of parameters that belong to said trial solutions, said subtokens being maintained in computer memory,
    characteristics of individual subtokens are analyzed, and
    the representational scheme is computer modified with respect to individual subtokens on the basis of corresponding analyzed subtoken characteristics.

3. The method of claim 1 wherein
    said tokens are each represented in said representational scheme as a string of characters,
    said representational scheme defines the number of characters in said string, said number corresponding to the resolution with which the values of said tokens represent said trial solutions, and
    said step of computer modifying the representational scheme includes computer invoking at least one operator for adjusting said number of characters in order to change said resolution.

4. The method of claim 3 wherein said operator is invoked on the basis of a measurement of convergence of the population of tokens.

5. The method of claim 1 wherein said representational scheme includes an adaptive translation mapping for converting values of tokens to corresponding trial solutions, and said modifying step includes invoking at least one operator for changing said adaptive translation mapping.

6. The method of claim 5 wherein said adaptive translation mapping defines upper and lower boundaries on said trial solutions and said operator changes at least one of said boundaries.

7. The method of claim 6 wherein said operator randomly perturbs said boundaries.

8. The method of claim 6 wherein said operator shifts said boundaries towards lower values.

9. The method of claim 6 wherein said operator shifts said boundaries towards higher values.

10. The method of claim 6 wherein said operator shifts both of said boundaries further apart.

11. The method of claim 6 wherein said operator shifts both of said boundaries closer together.

12. The method of claim 5 wherein said operator comprises an elitist operator which stores in said computer information about a token representing a favorable possible solution in one said iteration, and reimparts said information to a population of tokens in a later said iteration.

13. The method of claim 12 wherein said operator comprises an ultra elitist operator which stores information about the current most favorable trial solution in one said iteration, allowing the population of said tokens or said trial solutions to "forget" (not contain) said most favorable solution for a specified number of iterations after which said operator reimparts said information to the population of said tokens or said trial solutions 14. The method of claim 12 wherein said operator comprises a roving elitist operator which stores information concerning the most favorable trial solution in each said iteration and employs said information after each application of any other operator acting upon said adaptive translation mapping to assure that said mapping remains capable of representing said most favorable trial solution.

15. The method of claim 5 wherein said operator comprises a homotopy optimizer operator which adjusts trial solutions.

16. The method of claim 5 wherein said operator comprises a biased mutation operator which stochastically selects characters of said population of said tokens, mutates selected said characters evaluates said mutated tokens, and accepts or rejects said mutated characters dependent upon a stochastic sampling of a probability distribution dependent upon some function of the differences in the evaluations of said mutated tokens before versus after said mutations.

17. The method of claim 14 wherein said characters are mutated one at a time and the acceptance or rejection is determined after each mutation.

18. The method of claim 5 wherein said operator comprises an annealing schedule operator that either raises or lowers the rate at which mutations are accepted based on measurements of convergence and/or characteristics of said trial solutions.

19. The method of claim 5 wherein said operator comprises a splitting operator that splits the tokens into species and splits the trial solution space into domains specific to the species to permit searches to proceed simultaneously with respect to the different species.

20. The method of claim 5 wherein said operator comprises a joining operator that recombines two species of tokens into a single species for subsequent iterations of the solution method.

21. The method of claim 19 or 20 wherein said operator is triggered based on a measurement of the fourth moment of said trial solutions.

22. The method of claim 3 or 5 further comprising specifying threshold values for defining a range within which said operator is not invoked, and maintaining said threshold values in computer memory.

23. The method of claim 3 or 5 further comprising providing factors that define the magnitude of the effect of invoking said operator.

24. The method of claim 3 or 5 wherein
said tokens comprise subtokens, and
said operator is applied selectively to one or more of said subtokens.

25. The method of claim 1 wherein said step of analyzing characteristics of said tokens includes applying a statistical measurement across a population of trial solutions or a population of tokens.

26. The method of claim 25 wherein said measurement is a measurement of the convergence of said tokens.

27. The method of claim 26 wherein said operator comprises a dither operator, a homotopy optimizer operator, or an annealing schedule operator.

28. The method of claim 25 wherein said measurement is a measurement of the first moment of said trial solutions.

29. The method of claim 28 wherein said operator comprises a shift left operator or a shift right operator.

30. The method of claim 25 wherein said measurement is a measurement of the second moment of said trial solutions.

31. The method of claim 30 wherein said operator comprises an expansion operator, a contraction operator, a homtopy optimizer, or an annealing schedule operator.

32. The method of claim 25 wherein said measurement is a measurement of the fourth moment of said trial solutions.

33. The method of claim 32 wherein said operator comprises a splitting operator or a rejoining operator.

34. A computer method for finding the best solution to a problem of the kind for which there are a number of possible solutions, comprising
providing by computer a representational scheme for representing trial solutions as values of tokens, said representational scheme defining characteristics of said tokens,
using said representational scheme to represent by computer a population of chromosomes made up of genes whose values correspond to parameters of said possible solutions and are represented in accordance with said representational scheme,
maintaining said genes in computer memory,
computer processing said genes iteratively to produce successive generations of the chromosome population in order to cause the values of the genes to converge on the best solution,
in at least some generations, performing a computer measurement of convergences of the genes in the chromosome population, and the first and second moments of the parameter values of the possible solutions, and
computer modifying the representational scheme based on the measurements using computer-invoked operators which increase or decrease the resolution of the genes as stored in computer memory, and shift left or right and expand or contract the upper or lower boundaries of the parameters of the possible solutions.

35. The method of claim 34 wherein said operators include ultra elitism and roving elitism.

36. The method of claim 1 or 34 wherein said problem comprises a combinatorial optimization problem.

37. The method of claim 1 or 34 wherein said problem comprises a function optimization problem.

38. A computer method for finding the best solution to a problem of the kind having possible solutions within a solution space, comprising
providing a representational scheme for representing trial solutions as values of tokens in said solution space, said representational scheme defining characteristics of said tokens,
using said representational scheme to represent by computer, trial solutions in said solution space as values of tokens in accordance with said representational scheme,
maintaining said tokens in computer memory,
computer processing said tokens to change the token values and to thereby explore said solution space,
taking computer measurements of the tokens maintained in computer memory and corresponding possible solutions which reflect the nature of said problem, and
adjusting the computer representational scheme based on said measurements to enable said tokens to explore successive portions of said solution space at possibly changing resolutions in order to reach said best solution.

* * * * *